Figure 6:
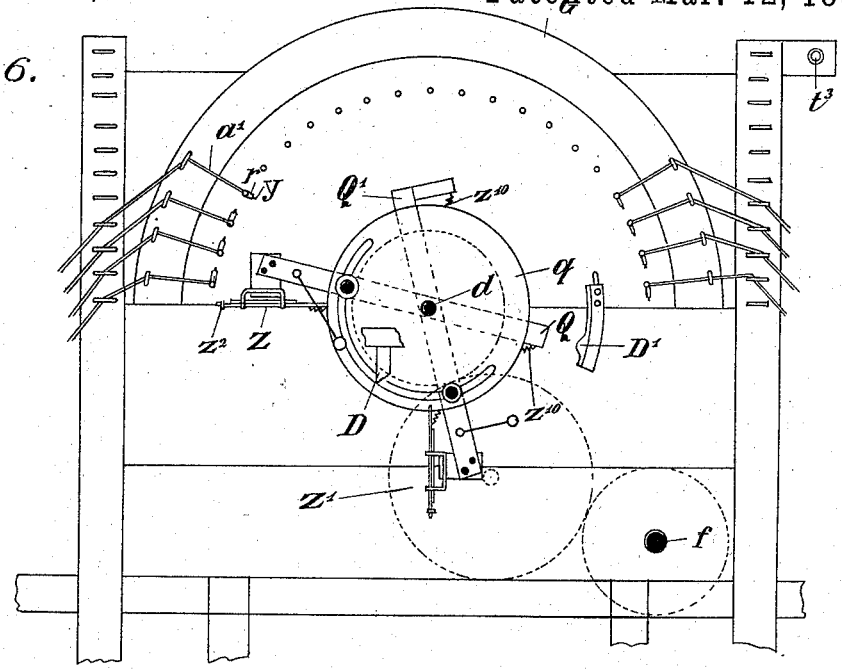

(No Model.) 17 Sheets—Sheet 1.
F. WATZLAWIK.
APPARATUS FOR MANUFACTURING CHENILLE.
No. 535,606. Patented Mar. 12, 1895.
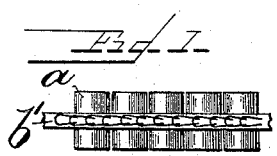
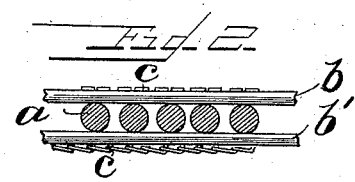
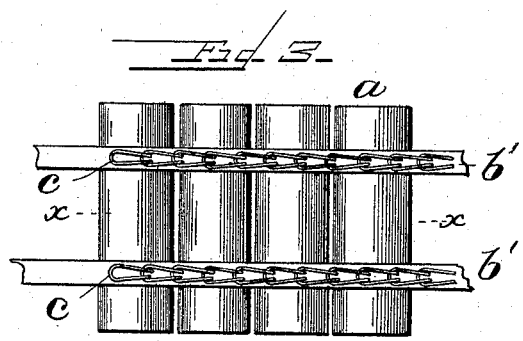
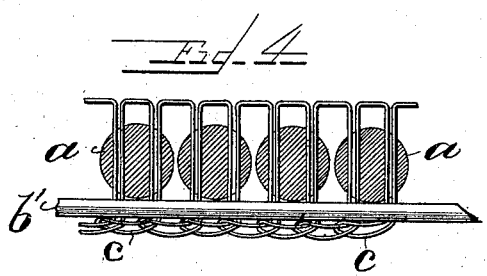
Witnesses
G. A. Taubenschmidt
J. D. Kingsbury
Inventor
Fritz Watzlawik
By Whitaker & Prevost
Attorneys (No Model.) 17 Sheets—Sheet 2.
F. WATZLAWIK.
APPARATUS FOR MANUFACTURING CHENILLE.
No. 535,606. Patented Mar. 12, 1895.
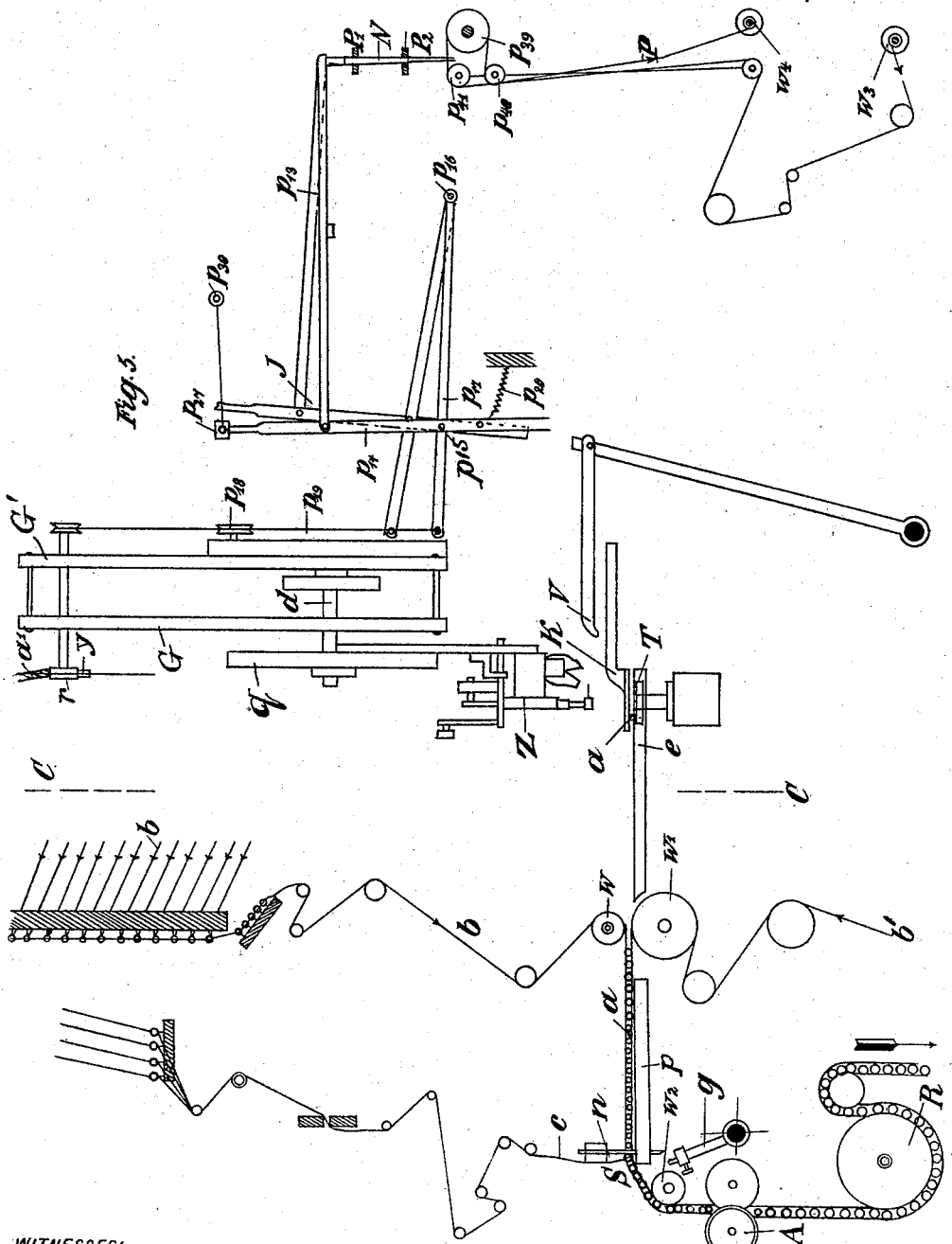
WITNESSES:
INVENTOR
ATTORNEYS.

(No Model.) 17 Sheets—Sheet 3.

F. WATZLAWIK.
APPARATUS FOR MANUFACTURING CHENILLE.

No. 535,606. Patented Mar. 12, 1895.

WITNESSES:
C. Sedgwick
E. M. Clark

INVENTOR
F. Watzlawik
BY
Munn & Co
ATTORNEYS.

(No Model.) 17 Sheets—Sheet 4.
F. WATZLAWIK.
APPARATUS FOR MANUFACTURING CHENILLE.
No. 535,606. Patented Mar. 12, 1895.

WITNESSES:

INVENTOR

ATTORNEYS.

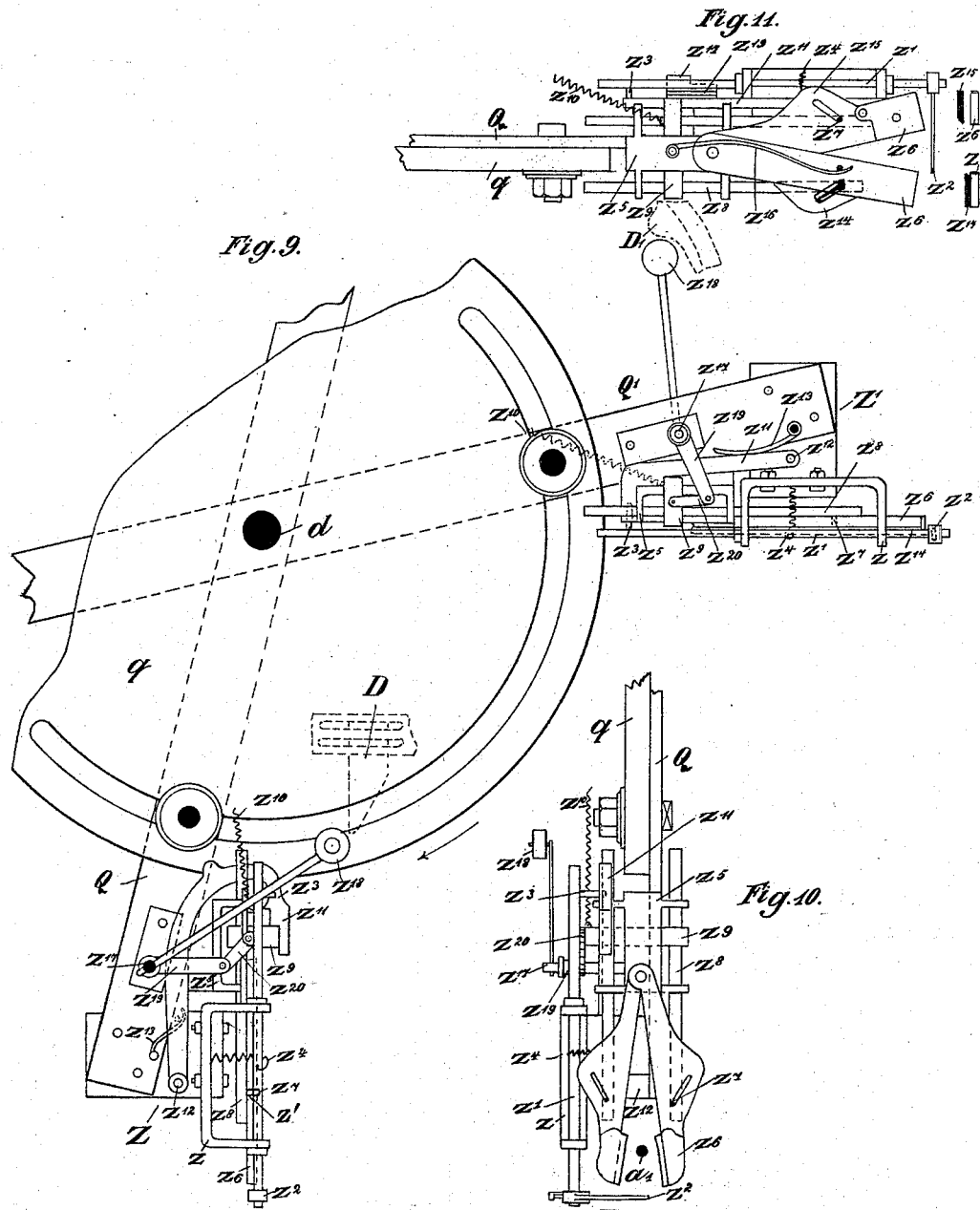

(No Model.) 17 Sheets—Sheet 6.
F. WATZLAWIK.
APPARATUS FOR MANUFACTURING CHENILLE.
No. 535,606. Patented Mar. 12, 1895.
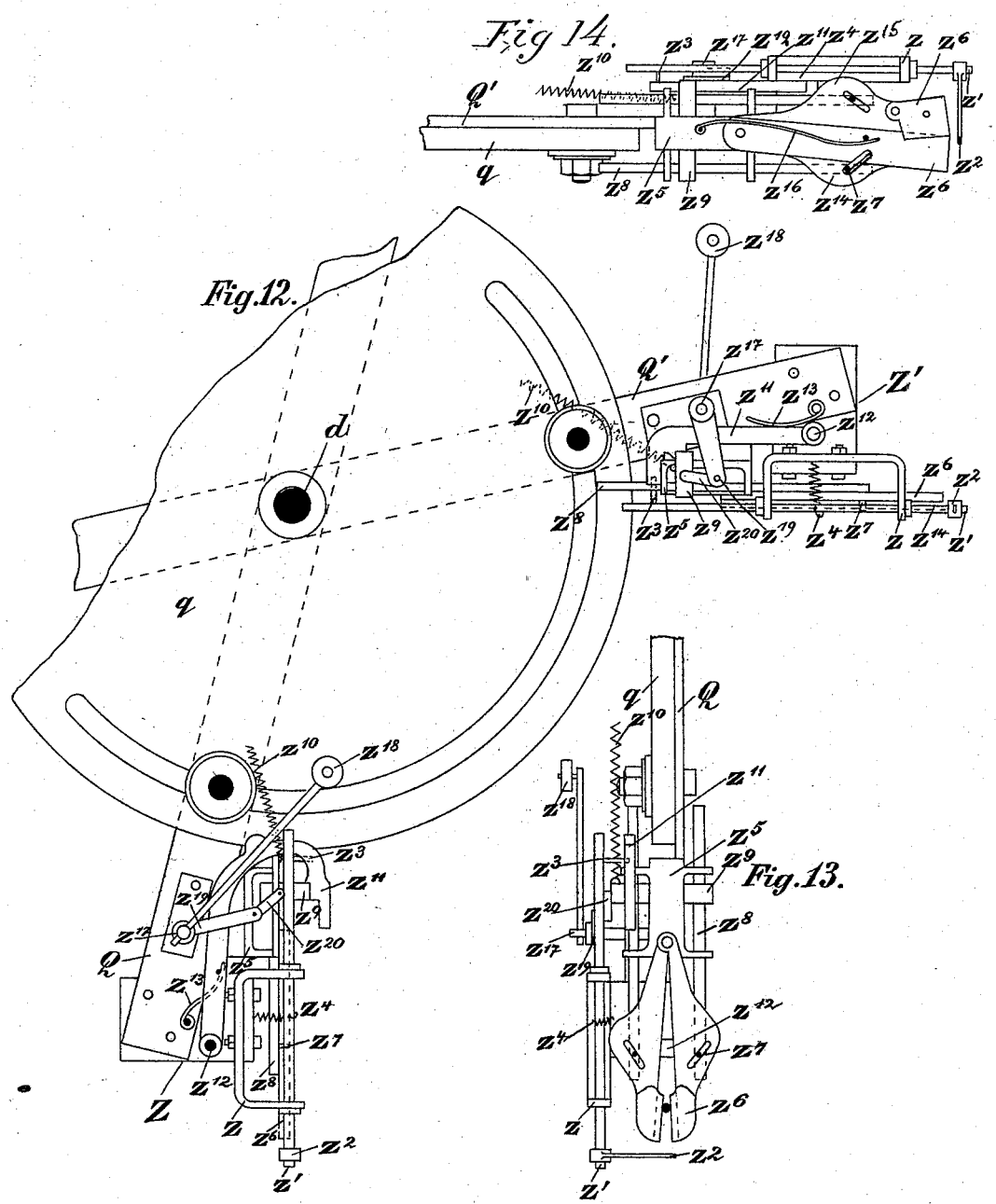
WITNESSES:
C. Sedgwick
E. M. Clark
INVENTOR
F. Watzlawik
BY
Munn & Co
ATTORNEYS.

(No Model.)  17 Sheets—Sheet 7.
F. WATZLAWIK.
APPARATUS FOR MANUFACTURING CHENILLE.
No. 535,606. Patented Mar. 12, 1895.
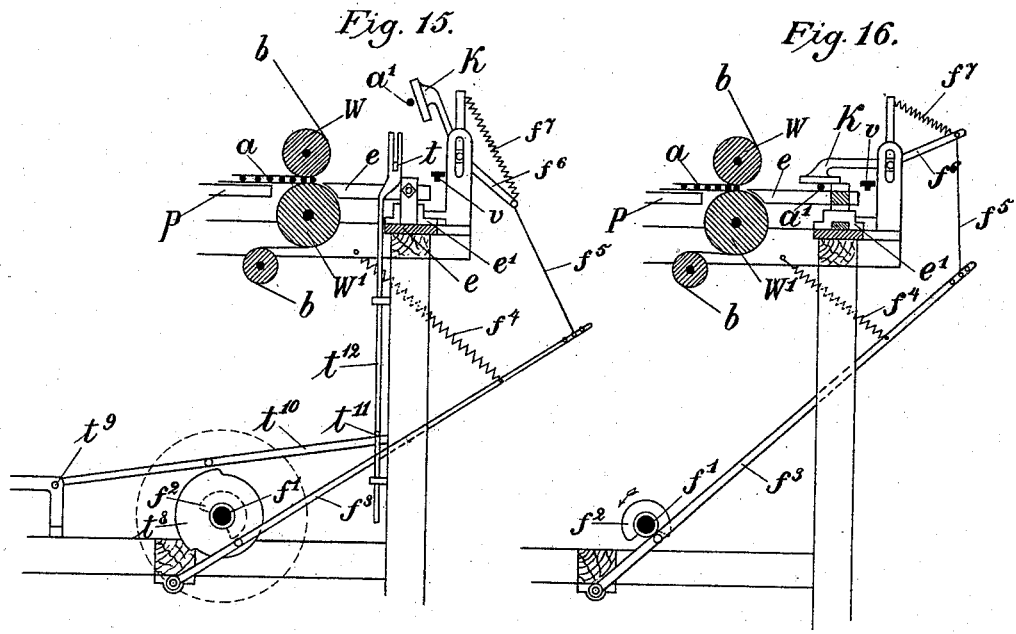
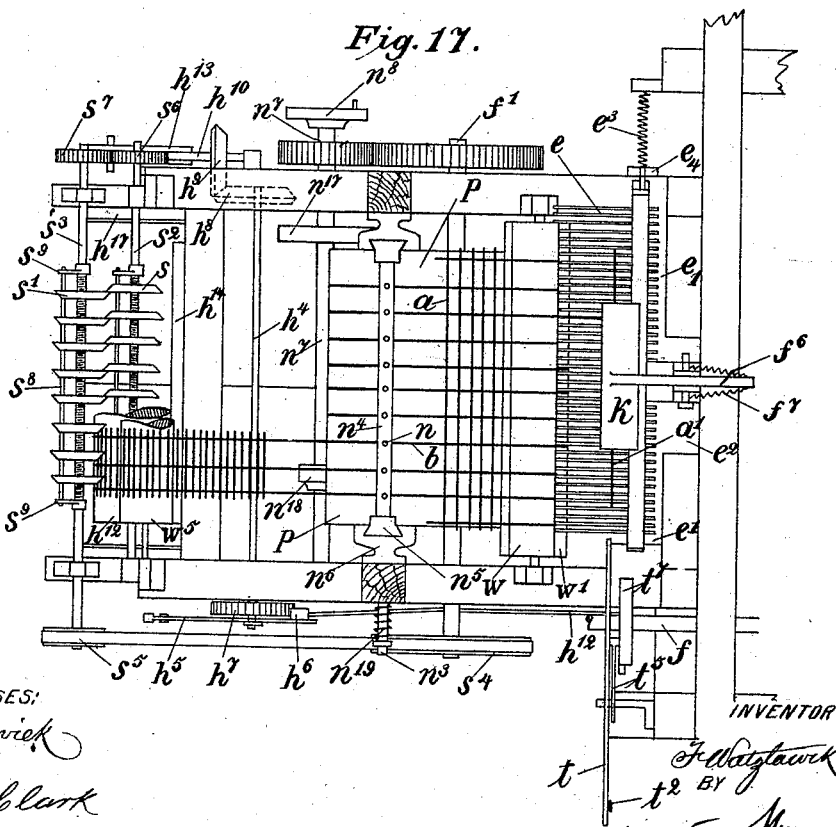
WITNESSES:
C. Sedgwick
E. M. Clark
INVENTOR
F. Watzlawik
BY
Munn & Co
ATTORNEYS.

(No Model.) 17 Sheets—Sheet 8.
F. WATZLAWIK.
APPARATUS FOR MANUFACTURING CHENILLE.
No. 535,606. Patented Mar. 12, 1895.
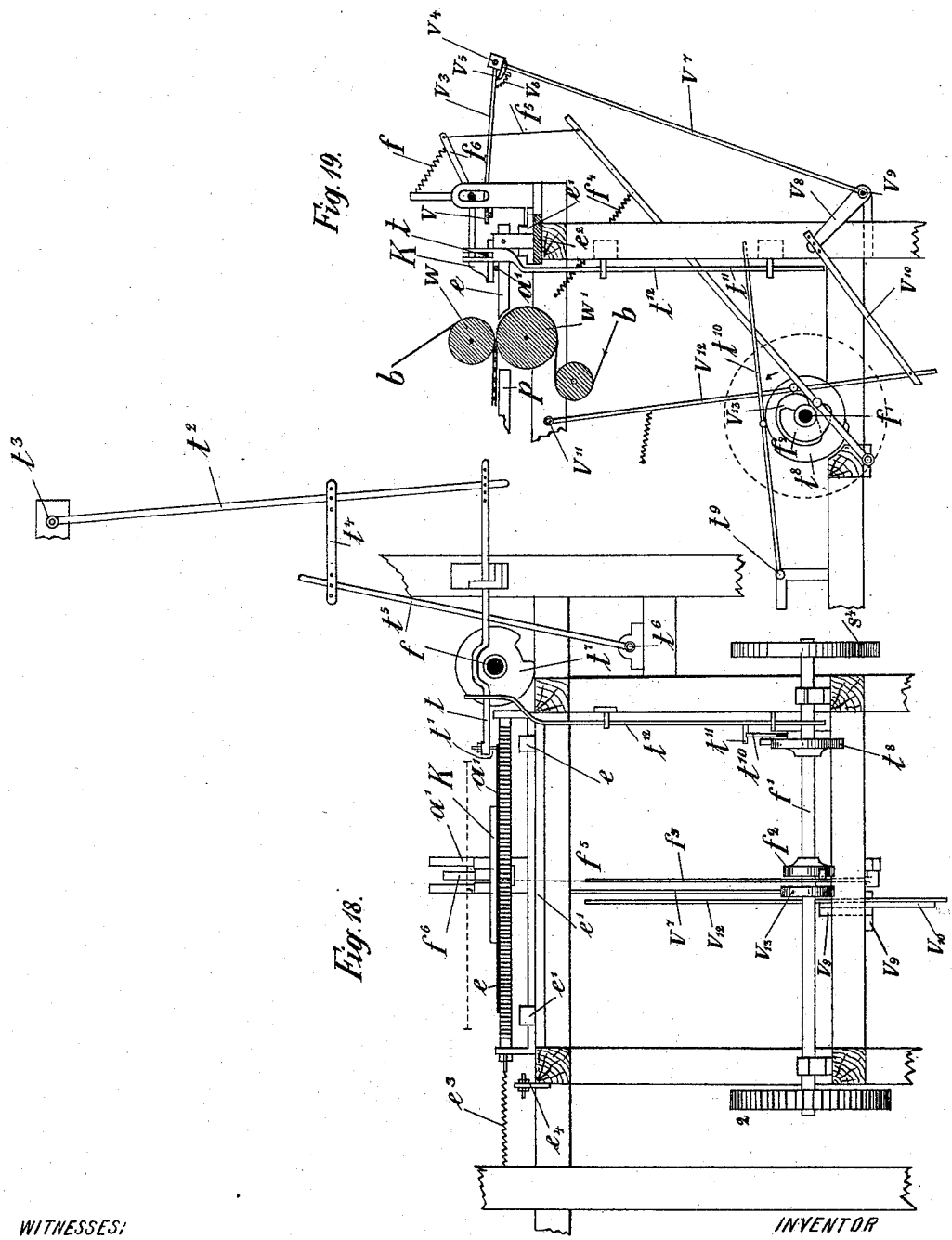

(No Model.)

F. WATZLAWIK.
APPARATUS FOR MANUFACTURING CHENILLE.

No. 535,606. Patented Mar. 12, 1895.

17 Sheets—Sheet 9.

WITNESSES:
C. Sedgwick
E. M. Clark

INVENTOR
F. Watzlawik
BY
Munn & Co
ATTORNEYS.

(No Model.) 17 Sheets—Sheet 10.

F. WATZLAWIK.
APPARATUS FOR MANUFACTURING CHENILLE.

No. 535,606. Patented Mar. 12, 1895.

WITNESSES:
C. Sedgwick
E. M. Clark

INVENTOR
F. Watzlawik
BY
Munn & Co.
ATTORNEYS.

(No Model.)  17 Sheets—Sheet 11.

F. WATZLAWIK.
APPARATUS FOR MANUFACTURING CHENILLE.

No. 535,606.  Patented Mar. 12, 1895.

WITNESSES:
C. Sedgwick
E. M. Clark

INVENTOR
F. Watzlawik
BY
Munn & Co.
ATTORNEYS.

(No Model.) 17 Sheets—Sheet 12.
F. WATZLAWIK.
APPARATUS FOR MANUFACTURING CHENILLE.
No. 535,606. Patented Mar. 12, 1895.
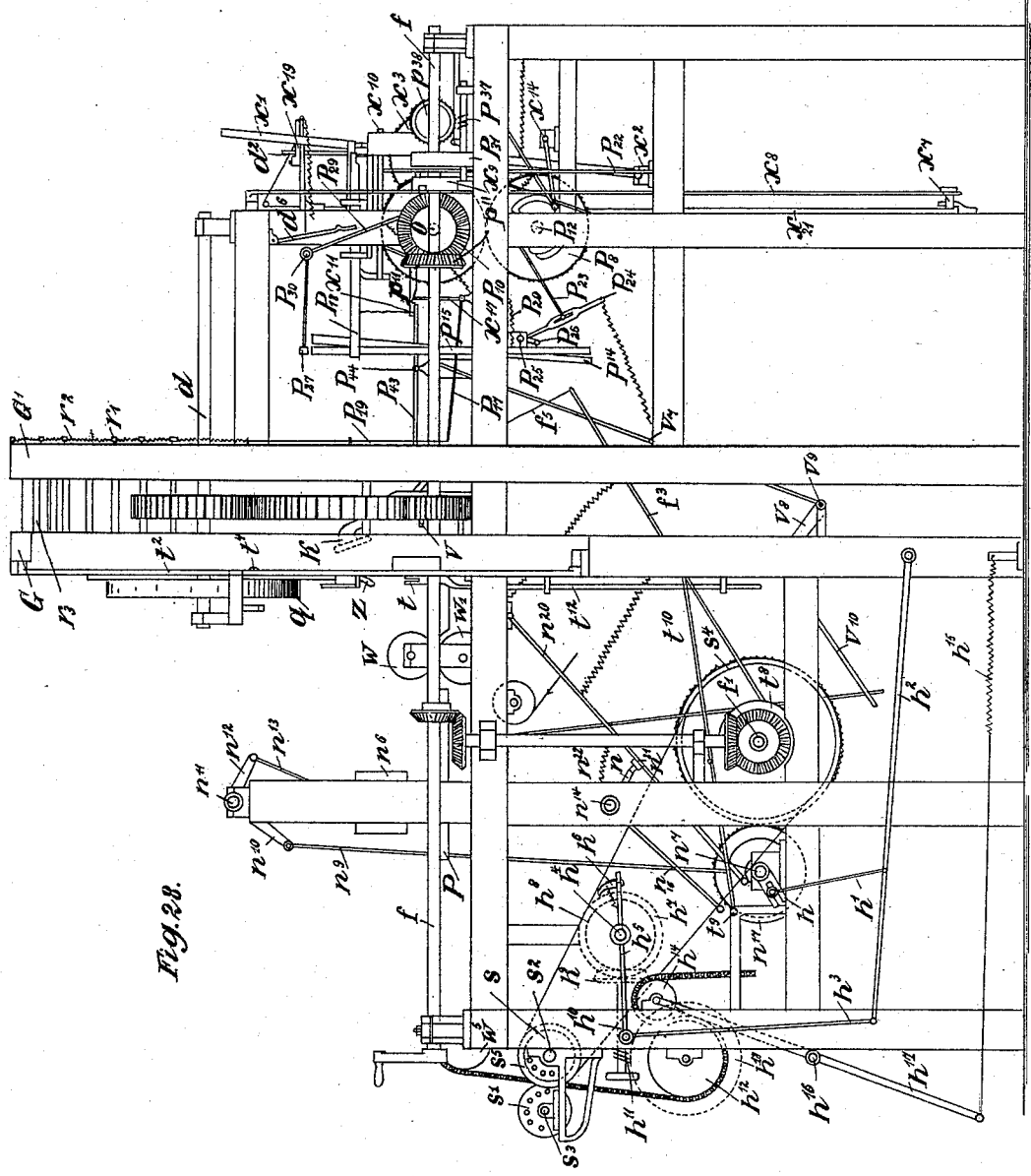
WITNESSES:
C. Sedgwick
E. M. Clark
INVENTOR
F. Watzlawik
BY
Munn & Co
ATTORNEYS.

(No Model.) 17 Sheets—Sheet 13.
F. WATZLAWIK.
APPARATUS FOR MANUFACTURING CHENILLE.
No. 535,606. Patented Mar. 12, 1895.
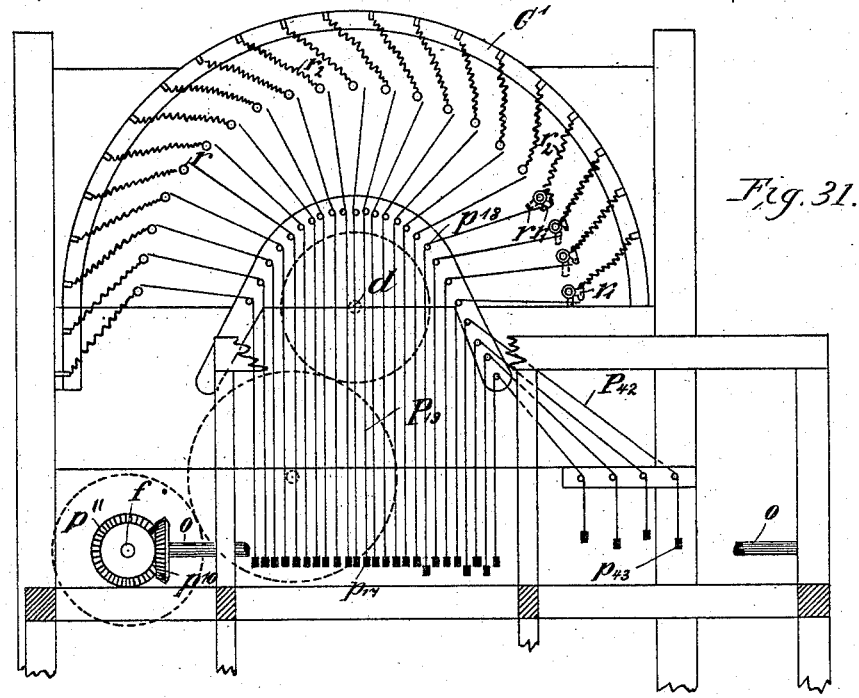
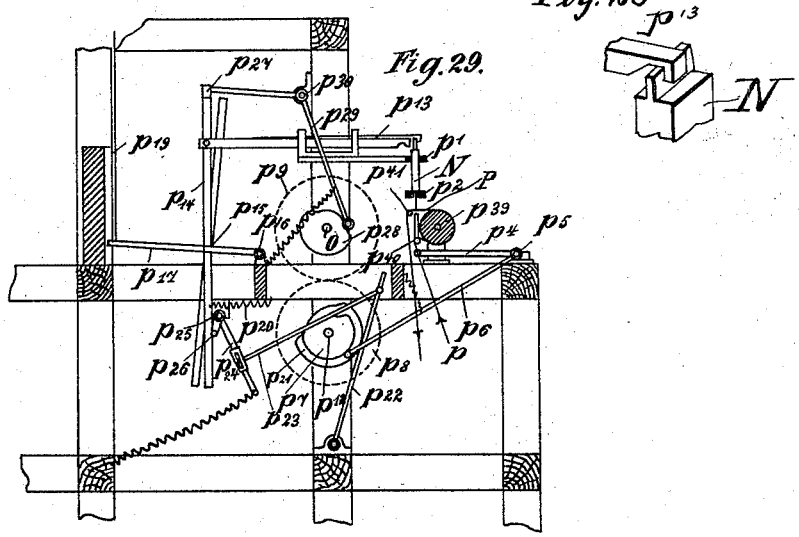
WITNESSES:
C. Sedgwick
E. M. Clark
INVENTOR
F. Watzlawik
BY
Munn & Co
ATTORNEYS.

(No Model.) 17 Sheets—Sheet 14.
F. WATZLAWIK.
APPARATUS FOR MANUFACTURING CHENILLE.

No. 535,606. Patented Mar. 12, 1895.

WITNESSES:
C. Sedgwick
E. M. Clark

INVENTOR
F. Watzlawik
BY Munn & Co
ATTORNEYS.

(No Model.) 17 Sheets—Sheet 15.
F. WATZLAWIK.
APPARATUS FOR MANUFACTURING CHENILLE.
No. 535,606. Patented Mar. 12, 1895.

(No Model.)  17 Sheets—Sheet 16.
F. WATZLAWIK.
APPARATUS FOR MANUFACTURING CHENILLE.
No. 535,606. Patented Mar. 12, 1895.
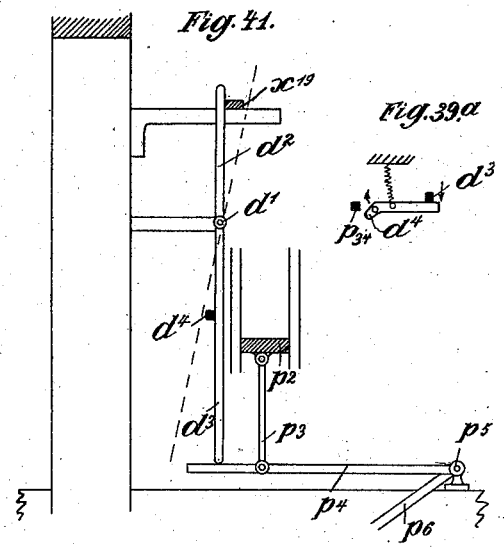
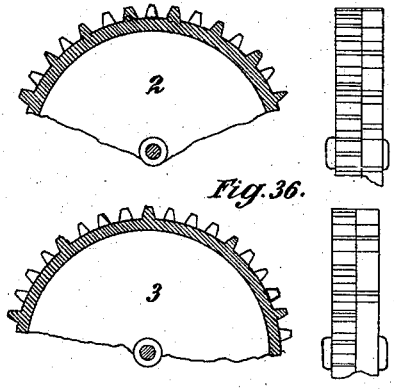
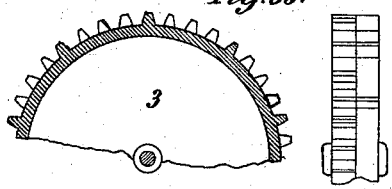
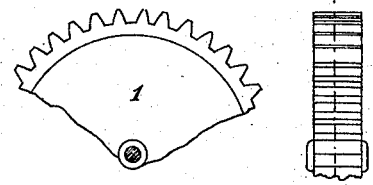
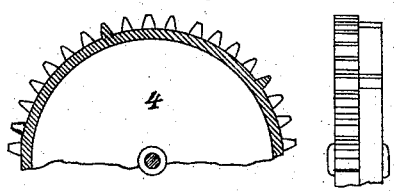
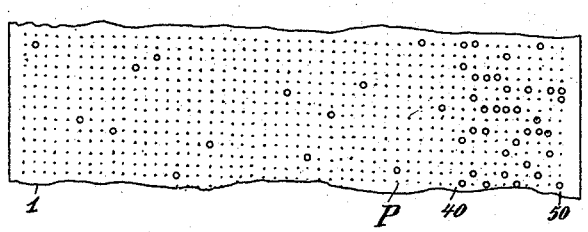
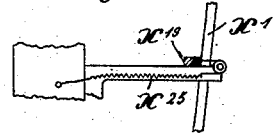
WITNESSES:
C. Sedgwick
E. M. Clark
INVENTOR
F. Watzlawik
BY
Munn & Co
ATTORNEYS.
THE NORRIS PETERS CO., PHOTO-LITHO., WASHINGTON, D. C.

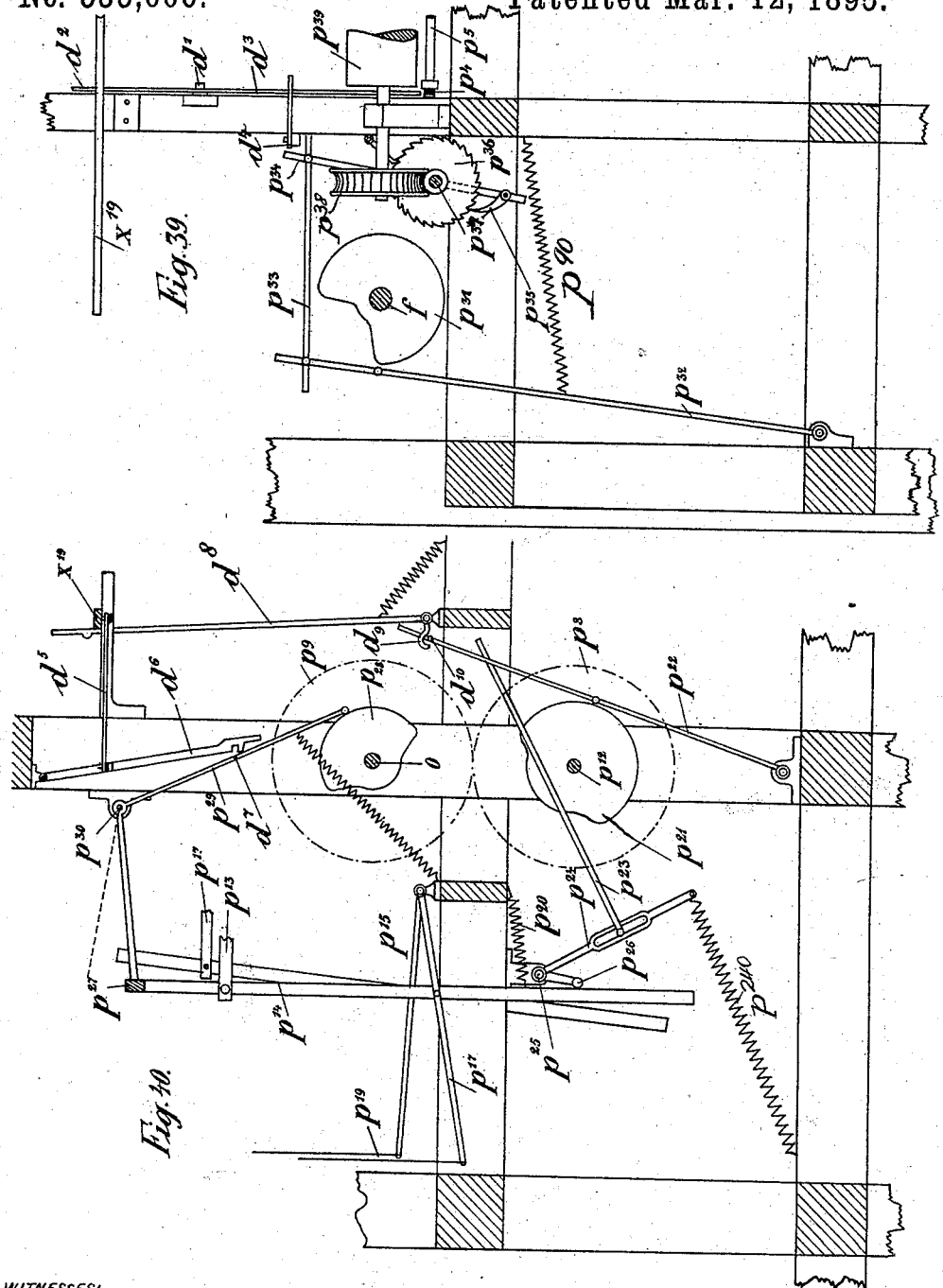

UNITED STATES PATENT OFFICE.

FRITZ WATZLAWIK, OF BERLIN, GERMANY.

APPARATUS FOR MANUFACTURING CHENILLE.

SPECIFICATION forming part of Letters Patent No. 535,606, dated March 12, 1895.

Application filed April 18, 1893. Serial No. 470,879. (No model.) Patented in England March 20, 1893, No. 5,913.

*To all whom it may concern:*

Be it known that I, FRITZ WATZLAWIK, of Berlin, in the Kingdom of Prussia and German Empire, have invented a new and useful Apparatus for Manufacturing Chenille for Use in Carpets, Curtains, Tapestries, and Like Fabrics, of which the following is a specification, reference being had therein to the accompanying drawings.

This invention was patented in England March 20, 1893, under No. 5,913.

This invention relates to an apparatus for manufacturing chenille for use in carpets, curtains, tapestries, and like fabrics, and its object is to produce a strong chenille which may contain a large variety of colors.

Figure 7:
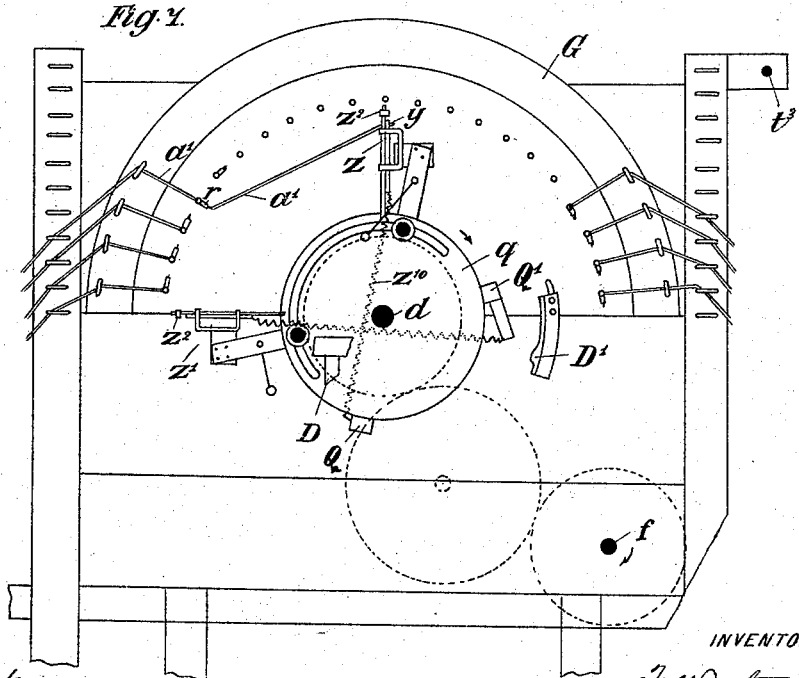
Figure 8:
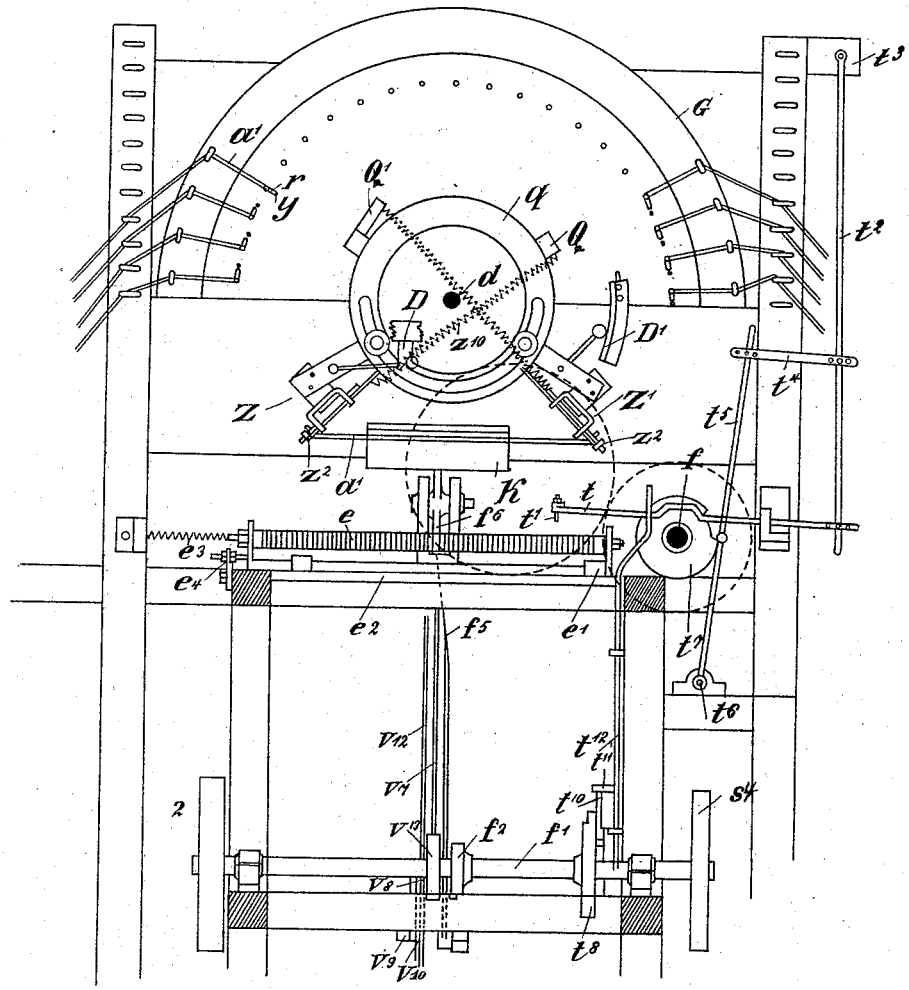
Figure 22:
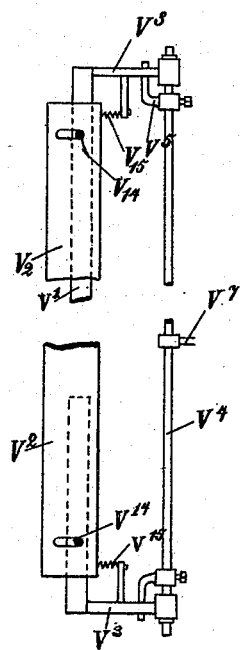
Figure 21:
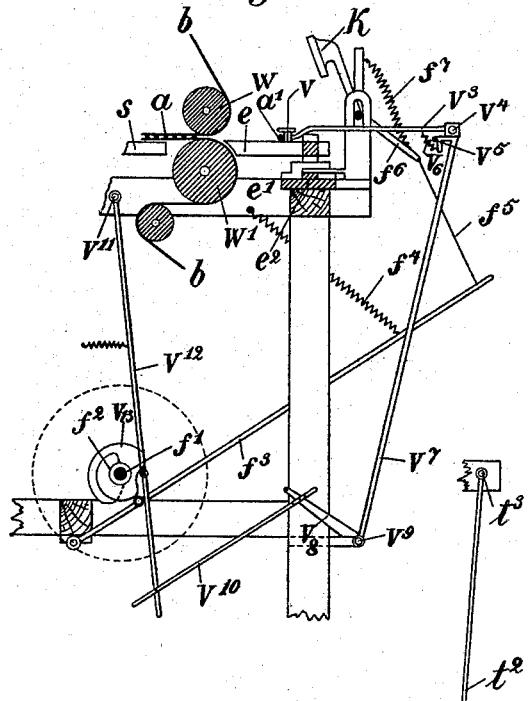
Figure 20:
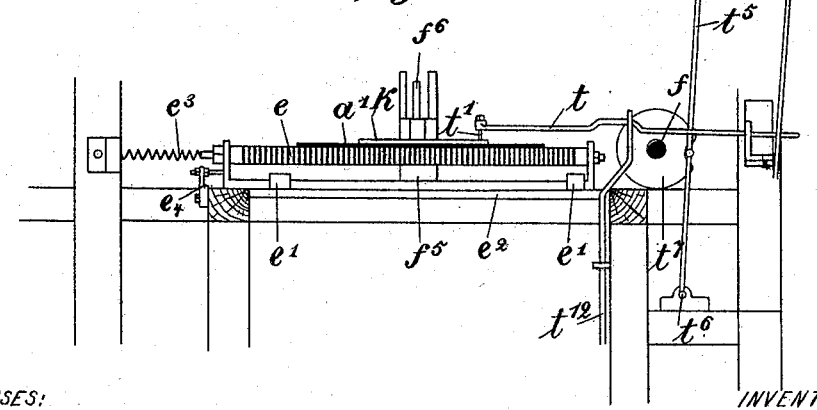
Figure 23:
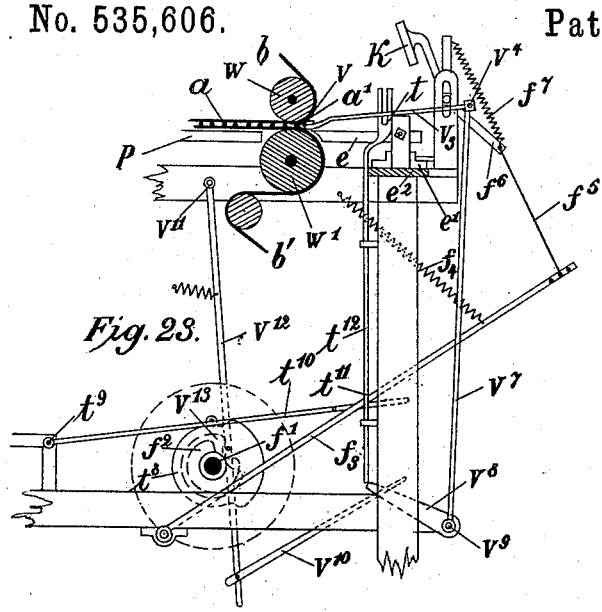
Figure 24:
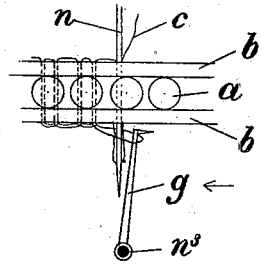
Figure 25:
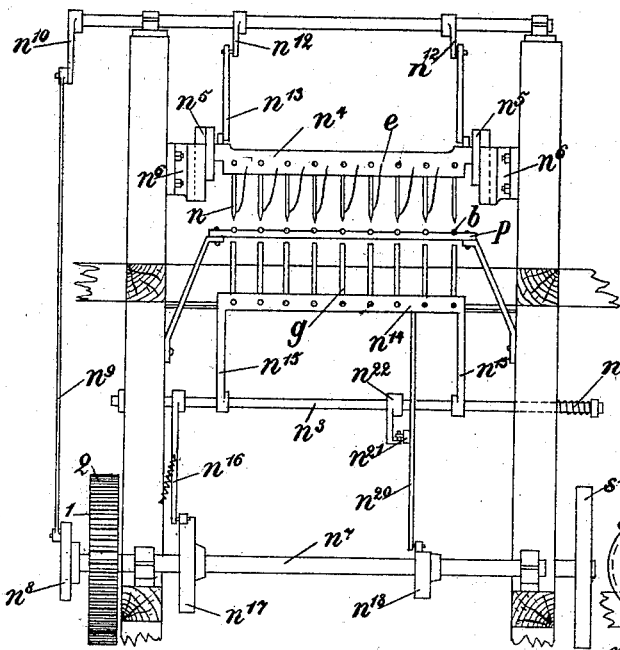
Figure 26:
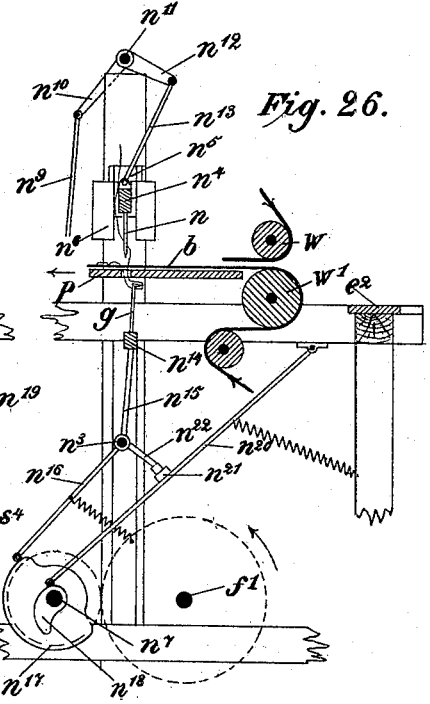
Figure 24:
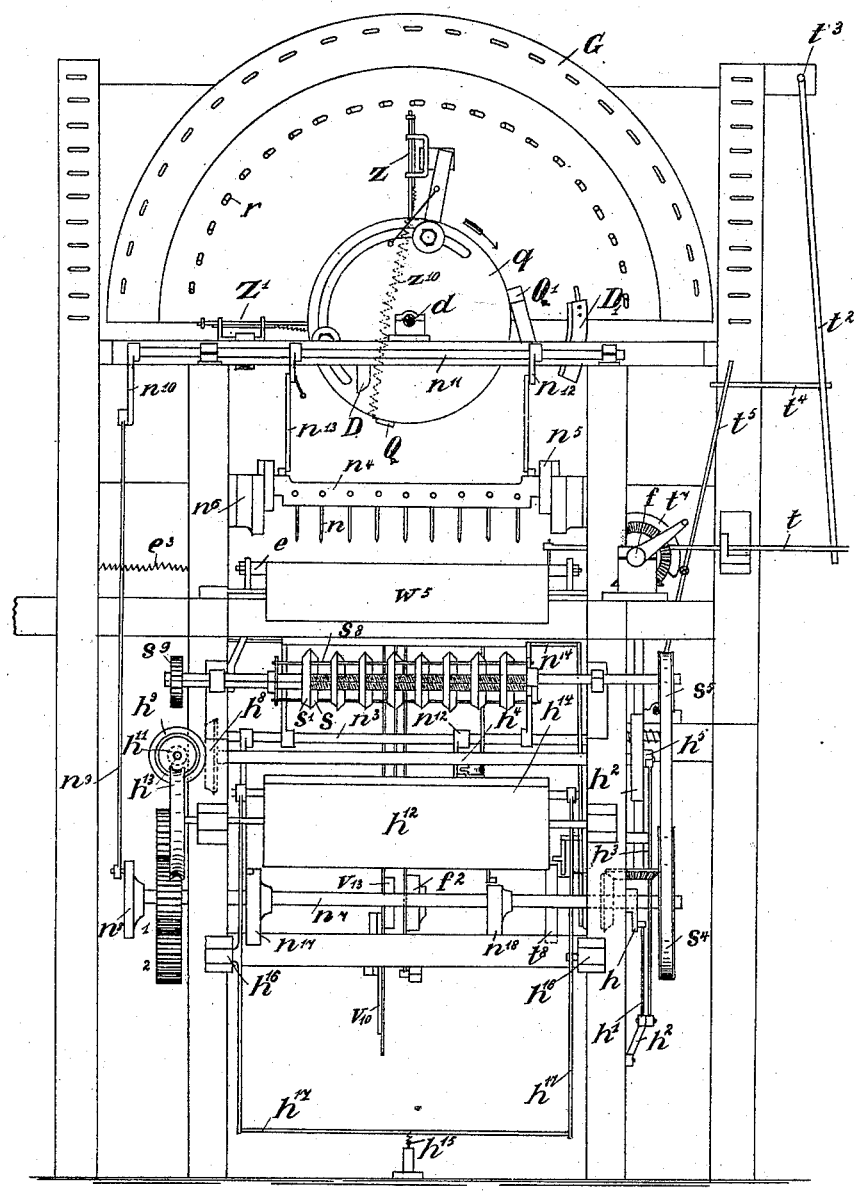
Figure 30:
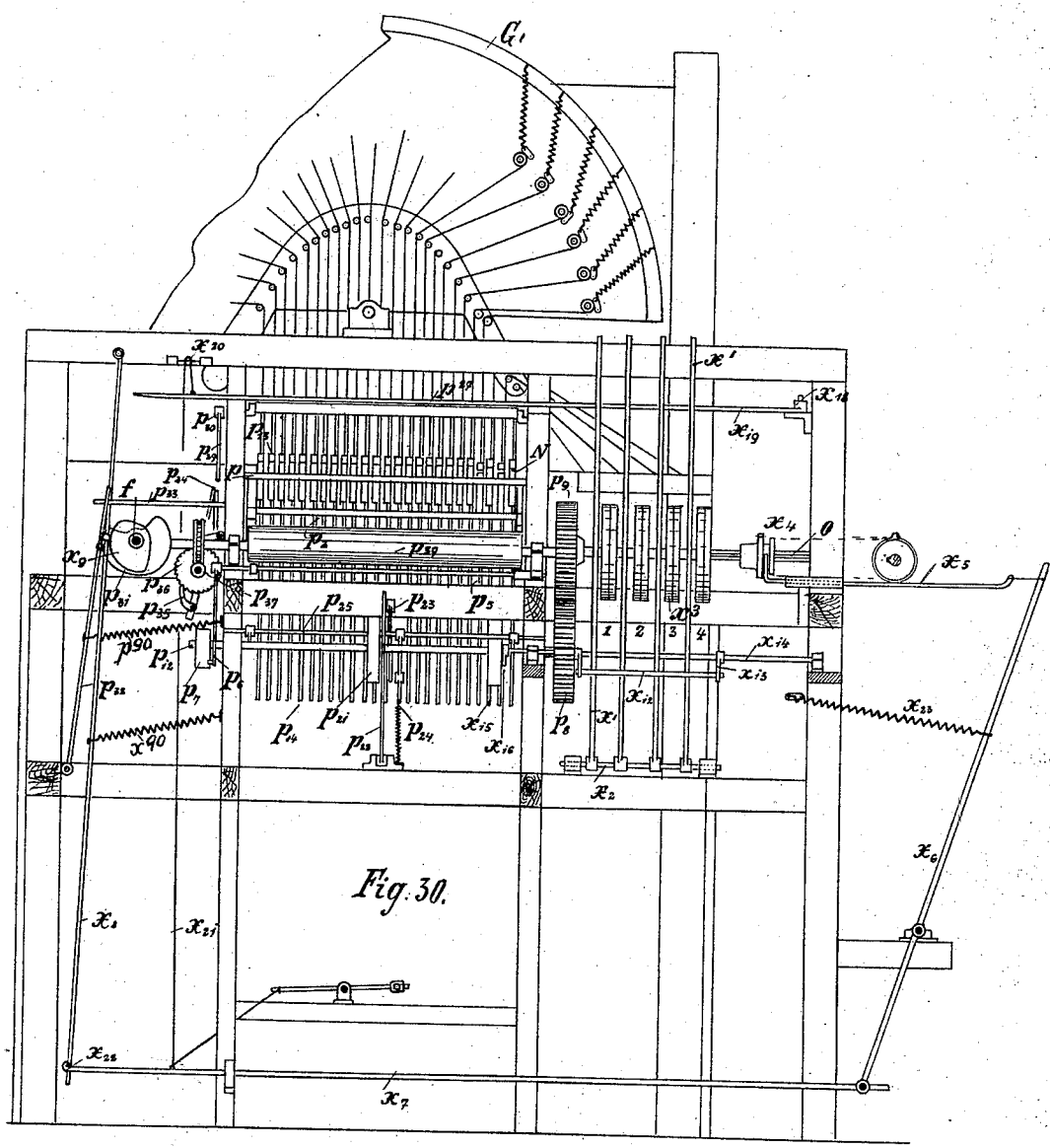

In the drawings, Figure 1 is an under side view on an enlarged scale of a thread or strand of chenille made by my machine. Fig. 2 is a side view of the same. Fig. 3 is an under side view of a band of chenille before cutting. Fig. 4 is a modified form of chenille. Fig. 5 is a diagrammatic view of my appliances to illustrate the mode of operation. Figs. 6 and 7 are front views of the thread delivery tubes and their supports with the grippers in different positions in relation thereto. Fig. 8 is a front view of the machine with the parts in front of the thread supporting grate removed. Figs. 9, 10, 11, 12, 13 and 14 are views illustrating the construction and operation of the grippers. Figs. 15 and 16 are partial views illustrating the presser and co-acting devices. Fig. 17 is a top or plan view of the front part of the machine. Figs. 18, 19 and 20 are partial views illustrating the construction and operation of the thread adjuster. Figs. 21, 22 and 23 are partial views illustrating the construction of the thread feeder and co-acting devices. Figs. 24, 25 and 26 illustrate the sewing mechanism. Fig. 27 is a front view of the machine. Fig. 28 is a side elevation of the same. Figs. 29 to 41 inclusive illustrate the thread selecting devices.

The method of producing the chenille is described with special reference to Figs. 1, 2, 3, and 4, of the accompanying drawings the apparatus employed being diagrammatically illustrated by Fig. 5. The finished chenille consists essentially of short parallel pieces of yarn stitched together so as to form a yarn of pile or nap which is used as the weft in weaving carpets, curtains, and similar fabrics. This method consists in stitching together the threads $a'$ (Fig. 1) which, when cut, form the nap $a$, between a series of pairs of strong binding threads $b\ b'$ of jute or similar material by means of a sewing thread $c$ formed with a single chain stitch each thread $a'$ being fixed by means of two stitches so that all the pile threads $a'$ are firmly fixed between the two horizontal rows of threads and form after being cut parallel to the binding threads a cord which shows a nap at the bottom as well as at the top. The colors of the consecutive pile threads may be varied to any desired extent and the number of the different colors that are used may be very great so that the pattern of the pile cord or chenille may be extraordinarily rich. If the threads $a'$ after being cut project equally far on both sides of the binding cords the height of the nap on both sides will be equal. It is however possible to give the nap a greater height on one side than upon the other and thus obtain great variety in the pattern of the pile cord. This is easily accomplished by cutting the colored threads between two binding threads nearer one binding thread than the other. Chenille made in this manner replaces the ordinary woven chenille and forms weft in the weaving of chenille carpets, chenille door hangers, and similar fabrics. For this purpose chenille is used or applied in the usual well known manner.

In the use of the ordinary chenille in weaving, binding wefts are necessary to form a ground to carry and support the chenille, but with chenille manufactured according to this invention such binding wefts are unnecessary as the strong threads $b\ b'$ lying on both sides form these binding or ground wefts. The pile threads of the new cord or chenille are firmly united which was not the case with the usual cords.

As a modification one of the strong binding threads, $b$ or $b'$, may be left out and the other one stitched to the pile threads $a$ as shown in Fig. 4 in which case again chenille cords for weaving purposes are obtained.

Fig. 5 illustrates a diagrammatic representation of the machinery employed for producing the pile-threads or chenille.

The binding threads which are separated into a lower system $b'$ and an upper system $b$ are guided with the necessary tension through eyes and over guide rollers and brought by means of rollers $w$ and $w'$ into a horizontal plane so that a certain space or distance remains between them which corresponds to the thickness of the pile threads $a$. The pile threads which are cut to equal lengths are put into this intermediate space. For cutting off and inserting them, mechanism is provided which grips the end $y$ of the pile thread $a$ by means of the tongs or grippers Z rotating on the axis $d$. These tongs pull the thread along with them during their rotation upon the axis $d$ and a second pair of tongs Z′ similarly mounted grip the thread $a$ at the end of the determined length and a pair of shears following immediately behind the second pair of tongs cuts off the thread. The tongs, the relative positions of which can be adjusted or regulated according to the desired length of the pile thread, participate continuously in the revolution of the axis $d$ and open when the pile thread which is gripped by them has been brought into a position for insertion between the binding threads $b$ and $b'$. At the moment when the two tongs open a presser K falls down and brings the pile thread $a'$ on to the grid or grating support $e$. As the thread is not placed exactly in position it is furthermore adjusted laterally together with $e$ by the mechanism indicated at T until it registers with the threads $a'$ which have already been properly inserted between the binding threads $b$. After this process it is placed by means of a feeding mechanism V between the rollers $w$ and $w'$ and thus between the binding threads $b$ and $b'$, the presser in the meantime having been lifted. The whole system of threads is then drawn over the fixed plate $p$ by means of the adjustable take up rollers R.

The sewing of the pile threads $a'$ to the binding threads $b$ and $b'$ by means of stitching threads $c$ is effected by means of any suitable sewing mechanism. I prefer to employ a sewing mechanism which will make the well known "chain stitch." In the accompanying drawings I have shown one form of sewing devices which may be employed for this purpose.

The oscillatory catchers $g$ grip the loops formed in the thread $c$ by the needles below plate $p$ for the purpose of forming the chain stitch.

By means of the take-up rollers R already mentioned, the finished web S is conducted over the roller $W^2$ to the cutting apparatus A which by means of rotating disks fitted with sharp edges cuts the pile threads between the binding threads in the direction of line $x\,x$ (Fig. 3) whereby as many pile or chenille cords are obtained as binding threads have been used above or beneath.

The choice of the color is determined by a Jacquard apparatus J the needles N of which are influenced by a pattern P which latter at every revolution of the axis $d$ of the rotating tongs and shears (that is at every take up of the pile thread and insertion between the binding threads $b$ and at every two stitches of the sewing needles $n$ through the pile thread $a'$) is moved forward the distance of one point of the pattern unless a repeating apparatus connected to the Jacquard apparatus prevents the forward motion of the pattern so as to cause the color then offered to remain. The pattern is wound off from the roller $W^3$ and by means of guide rollers conducted to the roller $w^4$.

Hereinafter is described detailed action of the whole machine the different principal parts above mentioned being described with reference to detailed drawings and under the following sub-headings: The rotating tongs and shears, the presser, the adjusting apparatus, the feeder, the sewing apparatus, the take-up, the cutting apparatus, the Jacquard and repeating apparatus.

*The Rotating Tongs and Shears.*

Figs. 6, 7 and 8 illustrate the rotating tongs or grippers and shears and show cross sections in planes parallel to the line C C looking in the direction of the arrow B in Fig. 5. The figures illustrate front views of the rotating tongs with their accessories. The driving shaft $f$ by means of an intermediate wheel rotates the shaft $d$ upon which is secured the rotating tongs. The whole gripping apparatus is represented on a larger scale in different views by Figs. 9 to 14 both in the closed and in the open positions and consists of a disk $q$ to which two rails Q Q′ are secured and which can be adjusted with reference to each other in an arc-shaped slot. These rails carry the two pairs of tongs Z Z′ of which the latter is provided with the shears. Upon the end of the rail Q is firmly fixed the loop $z$ in which the rod $z'$ provided with under and upper fingers $z^2$ and $z^3$ is capable of rotating. A spring $z^4$ holds the rod $z'$ in such a way that the lower finger $z^2$ stands perpendicularly to the plane of the rotating disk $q$. The rail Q also carries the bracket $z^5$ furnished with a pivot upon which the tongs $z^6$ turn. (See Fig. 10 which is a view at right angles to Fig. 9.) The blades of the tongs are each provided with an oblique slot into which project pins $z^7$ upon rods $z^8$ which are guided by the bracket $z^5$. Both rods $z^8$ are firmly joined to each other by the cross piece $z^9$ and the latter is constantly drawn toward the center of the disk $q$ by a spring $z^{10}$ (Figs. 12 and 13), which is fixed to the other end of the rail Q. This motion however is limited to the position shown in Fig. 9 by the stop $z^{11}$ which turns upon the pivot $z^{12}$ situated near the foot of the loop $z$. A spring $z^{13}$ insures the cross piece $z^9$ engaging with the catch or stop $z^{11}$.

The tongs $z^6$ are shown in the open position but are closed when the lower finger $z^2$ of the rod $z'$ knocks against one of a series of thread delivery tubes $r$ (Fig. 6) through which the pile thread $a$ is guided. These tubes $r$ are journaled in the fixed frame of a semi-circular plate G grouped in a semicircle so that a large number of differently colored threads can be supplied from their bobbins. These thread delivery tubes are adapted to be turned upon their journal or shaft so as to assume a radial position, but one of these tubes being placed in such position at a time; which tube is determined by the Jacquard and repeating apparatus to be described later on. The tube therefore offers the loose end of the thread radially to the revolving and open tongs Z. When the finger $z^2$ knocks against the tube $r$, the rod $z'$ is turned somewhat to the right (Fig. 9) carrying with it the upper finger $z^3$ which moves against the stop $z^{11}$. The finger $z^3$ causes the disengagement of the stop $z^{11}$ by turning it to the right. The spring $z^{10}$ comes into action, draws the cross piece $z^9$ and the rods $z^8$ toward the center of the disk $q$, and the pins $z^7$ fixed to the rods operate the tongs thus closing them and seizing the end of the thread $a$ as shown by Figs. 12 and 13. The spring $z^4$ immediately restores the rod $z'$ and fingers $z^2$ and $z^3$ into the original position vertical to the rotating plane, after the small tube $r$ has been passed.

The second pair of rotating tongs Z' fixed to the rail Q' is provided with shears $z^{14}$ and $z^{15}$, (Fig. 11). The construction of the parts that close the second pair of tongs Z' is exactly the same as that of the rotating tongs Z, the position only of these parts with relation to the rail Q' being different. Before the thread is cut off by the shears $z^{14}$ $z^{15}$ it must be firmly gripped by the tongs $z^6$. To enable this to be accomplished the tong blades are slightly in advance of the shear blades. One blade $z^6$ of the tongs and its shear blade $z^{15}$ are rigidly connected. The other shear blade $z^{14}$ is pivoted on the pivot of the shears but is free to move independently of its companion blade of the tongs. The inclined slot in the tong blade is wider than the slot in the shear blade $z^{14}$ and a spring $z^{16}$ acts upon a pin in the tong blade tending to force the blade in the direction to close the tongs thereby keeping the outer wall of the slot against the pin $z^7$. In the act of closing by reason of this construction the two blades of the tongs come first together the one blade being operated by the spring $z^{16}$. These tong blades come together before the pins $z^7$ have reached the end of their movement to close the parts operated by them. The further movement of the pins $z^7$ causes the connected tong and shear blade to advance, the tong blade pushing back its opposing tong blade, its actuating spring $z^{16}$ yielding for this purpose, while the independent pivoted shear blade moves forward and meeting the opposing shear blade severs the thread.

In Fig. 6 both tongs are open and rotate simultaneously with the shaft $d$. In Fig. 7 the tongs Z have gripped the end of the thread $y$ and pulled the thread $a'$ from the bobbin through the tube $r$ until the second tongs Z' have gripped the thread near the tube and separating it as shown in Fig. 8 in which the rotation of the tongs with the piece of thread stretched between them is shown farther advanced. By altering or adjusting the rails Q and Q' in the slot of the disk $q$ the length of the thread can be varied according to requirements. The closed tongs must now be opened to release the thread in the position shown in Fig. 8. This is effected by a thumb piece D and a stop D' which are adjustably secured to the frame. Upon the rail Q (Fig. 9) is a pivot $z^{17}$ for an angle lever $z^{19}$ which is provided with a friction roller $z^{18}$. The arm $z^{19}$ of the angle lever is joined or hinged to the cross piece $z^9$ by means of a link $z^{20}$. When the roller $z^{18}$ which in the closed state of tongs $z^6$ is in the high position (Fig. 12) reaches the thumb piece D it is pressed down (Fig. 9) whereby the cross piece $z^9$ with the rods $z^8$ and pins $z^7$ are also moved down until the stop $z^{11}$ in consequence of the tension of the spring $z^{13}$ engages again as shown in Fig. 9. The blades $z^6$ have opened and remain open until the lower finger $z^2$ again meets the short radial tube $r$, if the color of the thread is to be retained, or another tube, if the color is to be changed. In the same manner the tongs Z' are opened with the difference that here the stop D' lifts up the roller $z^{18}$ which in the closed state (Fig. 12) is in the lower position.

*The Presser.*

When the thread has been released by the tongs as shown in Fig. 8 it must be beaten or held down quickly on to the grate $e$ so that it does not fly sidewise. This is effected by the flap or presser K which at this moment comes into action. The operation is as follows (reference being made to Figs. 15, 16 and 17): The driving axis $f$ gears by suitable means with the shaft $f'$ which is driven at the same speed. The shaft $f'$ carries the eccentric $f^2$ which engages with the lever $f^3$ the roller of which by means of spring $f^4$ is compelled to bear against the eccentric $f^2$. By means of a cord or chain $f^5$ the lever $f^3$ is joined to the angle arm $f^6$ of the presser K. The eccentric $f^2$ as shown in Fig. 16 holds the presser K in the raised position until it is required to descend, the spring $f^7$ being held in tension. If however the recessed portion of the eccentric $f^2$ comes opposite the bowl upon the lever $f^3$ the spring $f^7$ suddenly contracts and the presser K descends upon the pile thread which has been placed upon grate $e$. Fig. 17 illustrates a plan of this position of the presser K upon the grate $e$ with the intermediate pile threads $a'$.

*The Adjusting Apparatus.*

I will now describe the apparatus by means of which the released pile thread $a'$ may be adjusted to register with the threads already introduced between the threads $b$ $b'$. The pile thread $a'$ which is held down by the presser K does not lie upon the grate $e$ in such a manner that it can be introduced directly into the space between the rollers $w$ and $w'$ since in consequence of the constant rotation of the tongs Z Z' it has been moved slightly too much to the left as shown in Fig. 18 by the dotted line. The proper position of the thread is shown in plan in Fig. 17. This excess to the left is not always the same however, but the thread must always be put between the rollers $w$ and $w'$ in such a way that its center and ends correspond with those of the web that is to be produced. Thus all the pile threads $a'$ which are to form the web must lie in such a way that all the ends on both sides are in a straight line. It is therefore necessary in the first instance to give the held down pile thread $a'$ a correct middle position. This is accomplished as shown in Figs. 8 and 18 by having a vertical finger $t'$ projecting from an arm $t$ which is hooked or jointed to the lever $t^2$ pivoted at $t^3$. By means of a rod $t^4$ the cam lever $t^5$ pivoted at $t^6$ is joined to this lever $t^2$. The lever $t^5$ is actuated by an eccentric $t^7$ upon the driving axis $f$ and this moves the adjusting arm $t$ forward and backward. In addition the adjusting arm is acted upon by an eccentric $t^8$ upon the shaft $f'$ (Figs. 15 and 18) which lifts the cam lever $t^{10}$ pivoted at $t^9$ up and down and acts upon the finger $t^{11}$ of the vertical rod $t^{12}$ and vertically reciprocates it.

The adjusting arm $t$ which is laid within the upper forked portion of the vertical rod $t^{12}$ thereby receives a vertical up and down motion. In Fig. 8 therefore, before the presser K descends upon the pile thread the adjusting arm $t$ in the raised position approaches the presser K. When the latter has dropped down (Fig. 20) the adjusting arm $t$ advances farther, and the rod $t^{12}$ moving downward at the same time the finger $t'$ of the adjuster will rest upon the upper face of the presser K. The adjuster $t$ however is at once moved backward by the eccentric $t^7$ upon the driving axis $f$ and drops down on to the pile thread $a'$ and grips over the same, likewise stretching the same straight at this portion, until it likewise leaves the same and drops into a slit of the grate $e$ immediately behind the right hand end. It now pulls the whole grate along with it to the right. For this purpose the grate $e$ moves in guide $e'$ (Fig. 16) upon the plate $e^2$. By means of a spring $e^3$ at the left (see Figs. 20 and 8) the grate $e$ up to this moment was drawn in that direction its movement being limited by a stud $e^4$. The presser K is mounted upon the grate $e$ (Fig. 16), therefore in its lowered position participates in the movement toward the right which in consequence of being joined to its treadle lever $f^3$ is admissible, until the eccentric $t^7$ upon the driving axis $f$ has brought the adjuster $t$ to the end of its stroke toward the right. This extreme position is shown by Figs. 18 and 19 in a vertical section and longitudinal section. The presser K is still lowered as is also the rod $t^{12}$, and the grate $e$ together with the thread $a'$ and the presser K have moved to the right. It therefore is immaterial as to how much the excess of fall to the left of the pile thread $a'$ amounts to, since the thread held by the grate and the presser will always be brought to the same point on the right, so that all pile-threads come into the same position.

The Feeder.

When the pile thread $a'$ has thus obtained its correct position the presser K, owing to the rotation of the cam $f^2$ which governs it, suddenly rises again, while the adjuster $t$ holds the grate $e$ in its right hand position, (Figs. 18 and 19.) The pile thread $a'$ is then advanced by the feeder V, (Figs. 21 and 22.) The feeding apparatus consists of a square rod V' guided above the grate $e$ (see Fig. 22, which illustrates it in plan) and upon and above which a rail or plate $V^2$ is arranged. The feeder V during the time in which it is at rest assumes the extreme right hand position as shown in Fig. 19 and as indicated in Figs. 15 and 16. The rod V' by means of arms $V^3$ (Fig. 22) is joined or hinged to a rod $V^4$ which latter is provided with brackets $v^5$ to support the arms $V^3$, (Figs. 19 and 21.) Springs $V^6$ (Figs. 19 and 21) hold the arms $V^3$ down upon these brackets. The rod $V^4$ is supported by the angle lever having arms $V^7$ and $V^8$ and pivoted at $V^9$. The arm $V^8$ by means of a rod $V^{10}$ is joined to the treadle lever $V^{12}$ pivoted at $V^{11}$ this lever being actuated by the cam $V^{13}$ keyed to the shaft $f'$. The feeder V at the correct moment, that is, after the presser K has risen (Fig. 21) is conducted to the left and thus moves the thread $a'$ by means of the rod V' against the rollers W and W'. The protection plate $V^2$ prevents the pile thread rising from the grate $e$. During the oscillations of the rod $V^4$ the springs $V^6$ are strained and always hold the rod V' firmly against the grate $e$. To bring the pile thread into the space between the rollers W and W' the cover plate $V^2$ covering the pile thread must be capable of moving back so that the rod V' gets as near as possible to the space between the rollers. The rail $V^2$ (Fig. 22) therefore is provided with slots into which the pins $V^{14}$ of the rod V' project or engage. Springs $V^{15}$ constantly force the rail $V^2$ forward. If however it should meet the roller W it slides back compressing the springs $V^{15}$. Fig. 23 shows this extreme position of the feeder V in which the pile thread $a'$ is introduced into the space between the rollers and between the two systems of binding threads $b\ b'$. As soon as this process is finished the feeder V consequent upon the revolution of its cam $V^{13}$ quickly goes back into its extreme right hand position (Figs. 15, 16 and 19), the adjuster $t$ is lifted away from the grate $e$ owing to the rise of the rod $t^{12}$ caused by the eccentric $t^8$ and the grate $e$ by means of the spring $e^3$ (Figs. 8 and 18) is drawn back again into its extreme position. At every revolution of the driving shaft $d$, at one revolution of the rotating tongs Z Z' and one revolution of the eccentric shaft $f'$ therefore one pile thread $a'$ is drawn out to the proper length and held down on the grate $e$ by the presser K. The grate $e$ is then moved sidewise together with the pile thread until it has obtained the proper position and the pile thread by means of the feeder V is pushed into the space between the rollers W and W'. The presser K is operated and the feeder V moves in each direction.

The Sewing Apparatus.

The binding threads $b'$ of the lower system being drawn out by the takeup rollers R as required (Fig. 5) over the fixed plate $p$, are stitched together with the binding threads $b$ of the upper system and the intermediate pile threads $a'$ by means of two stitches of the sewing apparatus. For the proper guidance of the binding thread $b'$ the plate $p$ is provided with half round longitudinal grooves or ridges which take up the binding threads.

Fig. 24 shows the principle of the formation of the simple chain stitch. The needle $n$ pierces vertically through the two binding threads $b$ and $b'$ and the intermediate pile thread $a'$ and thus passes the sewing thread $c$ through the parts that have to be stitched forming a loop beneath. Into this loop enters a hook $g$ pivoted at $n^3$ which having come to its extreme position on the right, rests, and the needle $n$ rises. The fabric is now fed for the distance of one stitch in the direction of the arrow, the needle having reached its highest position. The needle then again pierces through the fabric and passes through the loop held by the hook $g$ (Fig. 24). The hook is then removed quickly to the left releasing its loop and the operation is repeated. The needle $n$ therefore must receive a vertical up and down motion and the hook $g$ a reciprocating motion around its axis $n^3$. In addition the hook receives a lateral motion along the axis so that the needle $n$ does not catch it when descending, and to insure the hook $g$ when swinging back to the left evading the needle $n$ which has gone through its loop. This is obtained in the following manner: All the needles $n$ are inserted into a needle bar $n^4$ and are adjusted and secured by suitable means. This bar has slides $n^5$ (see Fig. 17 which illustrates a plan, Fig. 25 representing an elevation and Fig. 26 showing a vertical longitudinal section) which move up and down vertically in the guide pieces $n^6$ of the frame. The bar receives this vertical motion (since two sewing stitches are to be made during one introduction of the pile thread) from the shaft $n^7$ which is driven from the cam shaft $f'$ the gearing $1^a$ $2^a$ being in the ratio of two to one. The shaft $n^7$ carries a crank disk $n^8$ and communicates motion to the needle bar through the crank rod $n^9$, lever $n^{10}$ upon shaft $n^{11}$, two arms $n^{12}$ fixed to the shaft and two rods $n^{13}$ communicating with the bar. It will be understood that the plate $p$ is provided with fine holes to allow the passage of the needles. The hooks $g$ are fixed to a bar $n^{14}$ (Figs. 25 and 26) which is firmly fixed to the shaft $n^3$ by two arms $n^{15}$. Through the treadle lever $n^{16}$ operated by the cam $n^{17}$ upon the axis $n^7$, and the return spring the catcher bar $n^{14}$ receives its forward and backward swinging motion to the left. When the treadle lever $n^{20}$ is lifted by the cam $n^{18}$ a cam projection $n^{21}$ upon it acts upon the roller of an arm $n^{22}$ firmly fixed to the shaft $n^3$ and moves the hooks laterally. Since all these movements are derived from the shaft $n^7$ and as such shaft is given two revolutions to every single operation of the thread supplying devices it follows that two stitches will be obtained for every pile-thread. Of course the formation of the chain stitches may also be effected by others of the well known methods.

The Take-Up.

Under this heading is described the take up apparatus, indicated at R Fig. 5. The object of this apparatus is to draw along the finished fabric and to accomplish the feeding or shifting for the sewing mechanism. Owing to the fact that the latter makes two stitches for every revolution of the main shaft $f$—that is, for one introduction of the pile thread, the take-up must likewise pull twice, and it is for the latter reason that the shaft $n^7$ which actuates the sewing apparatus is utilized for its propulsion.

Upon $n^7$ (see Fig. 27 for a front view of the whole machine and Fig. 28 for a side view) a crank $h$ is fixed which by means of rod $h'$ lifts the lever $h^2$ and transmits its motion by means of the rod $h^3$ to a lever $h^5$ pivoted at $h^4$. The pawl $h^6$ upon the lever $h^5$ propels the ratchet wheel $h^7$ and turns the shaft $h^4$ and the pair of bevel wheels $h^8$ and $h^9$. The wheel $h^9$ is secured upon the shaft $h^{10}$ carrying a worm $h^{11}$ engaging into the worm wheel $h^{13}$ of the take-up cylinder $h^{12}$. The take-up cylinder $h^{12}$ therefore is positively turned the length of the chain stitch. The broad pile web coming from the plate $p$ is conducted over the roller $w^5$ to the take up cylinder $h^{12}$ and on its way there is cut into the separate pile cords by the cutting apparatus. The cords are conducted over the roller $h^{12}$ and the pressure roller $h^{14}$. The pressure between the rollers $h^{12}$ and $h^{14}$ is obtained by the spring $h^{15}$ which acts upon the lever $h^{17}$ pivoted at $h^{16}$.

The Cutting Apparatus.

The cutting apparatus is illustrated by Figs. 17, 27 and 28. It consists of two shafts $s^2$ and $s^3$ furnished with cutting disks $s$ $s'$. The two shafts are geared together by the wheels $s^6$ and $s^7$ and are driven by the pulleys $s^4$ and $s^5$. The shafts are situated one on each side of the fabric which has to be cut. To allow of the cutting disks being adjusted at will upon their shafts as required by the intended greater or smaller height of the pile, they are provided with threads screwed on to the shaft which is also provided with a corresponding thread (Fig. 17). To insure the disks remaining in their positions they are provided with a large number of holes arranged in a circle (Fig. 28) and rods $s^8$ (Fig. 17) are put through all the disks upon the shafts, the rods being firmly fitted or coupled to the shafts by means of the arms $s^9$. If it is required to alter the position of one or the other of the disks the rod $s^8$ is withdrawn, the position of the disks altered by turning them upon the spindle and then the rod pushed again through the disks.

*The Jacquard Repeating Apparatus.*

I will now describe the Jacquard and repeating apparatus. It has already been shown that one tube $r$ must always be put into the radial direction (Figs. 6, 7, 8 and 27) to offer the free end of the thread ($y$) to the rotating tongs Z. A pattern P (Fig. 5) determines which of the tubes or which color has to be used. This pattern P (Fig. 33) may have a row of holes equal in number to the number of colors being used in the frame G. In Figs. 6, 7, 8 and 27 only twenty-one tubes are shown; but I do not limit myself to this number. Above the pattern P and guided in a fixed plate $p'$ are needles N which rest upon and pass through the plate $p^2$ and are raised and lowered with it. (See Figs. 29 and 30.) The plate $p^2$ by means of rod $p^3$ is joined or hinged to the arms $p^4$. (See Fig. 41.) These arms are secured to shaft $p^5$ to which is firmly connected the treadle lever $p^6$. This lever bears upon a cam $p^7$ on shaft $p^{12}$ and is held in contact therewith by a suitable spring. The shaft $p^{12}$ is operated from the shaft O by gear wheels $p^8$ and $p^9$ mounted on the respective shafts and the shaft O is driven from the main shaft $f$ by bevel gear wheels $p^{10} p^{11}$ connecting them. The cam $p^7$ and the spring connected with the treadle lever $p^6$ serves to give the requisite movement to that lever and accomplishes the lifting and lowering movements of the needle plate $p^2$ and the needles N.

The upward movement of the plate $p^2$ is made for the purpose of withdrawing all the needles from engagement with the pattern card to enable the latter to be moved prior to beginning the series of operations in the selection of a thread to be presented to the gripping mechanism. On the downward movement of the plate $p^2$ the one needle which stands over the hole in the pattern will sink down into the hole, when the plate $p^2$ descends, whereas the other thirty-nine needles remain or rest upon the pattern P in a higher position. Above the needles N N an equal number of lifting wires $p^{13}$ (see also Fig. 40) are arranged, which are so supported that they can be moved longitudinally and also vertically. These wires $p^{13}$ with their hooks hang upon the needles N in the manner shown on an enlarged scale in Fig. 39$^a$, and during the lifting and falling remain upon the latter. Only the one needle which drops into the hole of the pattern card P releases its wire. The latter is pulled to the left while the other wires are arrested by their needles and do not participate in this movement to the left. Each of the wires $p^{13}$ is attached to a rod $p^{14}$ which has its turning point $p^{15}$ in a lever $p^{17}$ pivoted at $p^{16}$. The end of each lever $p^{17}$ by means of a cord $p^{19}$ running over a roller $p^{18}$ is connected to one arm of the small double lever $r'$ of one of the thread guide tubes $r$. (See Figs. 30 and 31.) The other arm of each small double lever $r'$ by means of a spring $r^2$ is held in such a way that the tube $r$ is always in the longitudinal or tangential position. If, however, one of the cords $p^{19}$ is drawn down the small tube $r$ is turned into the radial position.

All the thread guide tubes (Fig. 32) are fixed to shafts $r^3$ which are mounted in the frame pillars or walls G and G'. Between these walls the cog wheels provided for driving the shaft $d$ of the rotating tongs, are arranged one of them upon the driving shaft $f$, one upon the axis $d$ and an intermediate wheel for both. The pulling of the cords $p^{19}$ is effected by means of the levers $p^{14}$ (Figs. 29 and 40) upon their downward movement. The one wire $p^{13}$ which has been released moves to the left owing to the pull of the spring $p^{20}$ while all the rest of the wires remain in their positions on the right.

After every operation of the selecting devices, whereby one of the thread delivery tubes is placed in position to deliver its thread to the grippers or tongs, the lever $p^{14}$ which has been moved out of its normal position in this operation is returned to its original position by a rod $p^{26}$ which is carried by arms depending from a shaft $p^{25}$. To this shaft is secured another arm $p^{24}$ which is connected by a link $p^{23}$ with a lever $p^{22}$ which bears against a cam $p^{21}$ on shaft $p^{12}$. A spring $p^{240}$ connected to the framing of the machine is attached to the arm $p^{24}$ and holds the lever $p^{22}$ in contact with the cam. When the higher grade of the cam is in contact with the lever $p^{22}$ it moves it to the right and by its connections with the arm $p^{24}$ withdraws the rod $p^{26}$ from contact with the levers $p^{14}$. In this position the levers are free to be operated by their springs $p^{20}$ when their wires $p^{13}$ are released from the needles. When the lower grade of the cam is brought against its point of contact with lever $p^{22}$ the spring heretofore referred to draws that lever to the left moving the rod $p^{26}$ in the same direction and bringing all of the levers $p^{14}$ into position to have their wires $p^{13}$ engaged by the needles. The needles N together with the needle plate $p^2$ now descend and one of them sinks into the hole of the pattern P, releases its wire $p^{13}$, and the rod $p^{26}$ in consequence of the continuous revolution of the eccentric $p^{21}$ moves back to the right. This wire $p^{13}$ is drawn to the left since spring $p^{20}$ at the bottom pulls the lower end of the rod $p^{14}$ to the right. A suitable pressure rod or depressor $p^{27}$ arranged above the wire rod $p^{14}$ descends taking along with it the rod $p^{14}$, lever $p^{17}$ and cord $p^{19}$, which latter puts the little tube $r$ connected to it into the radial position. After the pile thread has been gripped and cut off the eccentric $p^{21}$ has made one revolution and through the movement of the lever arm $p^{26}$ to the left the wire rod $p^{14}$ is turned again in such a way that its wire again engages by means of its hook with the needle in the same way as the other wires. The needles are now caused to ascend, the pattern P is advanced for one row, and another hole comes into operation and effects the radial movement of its small tube $r$. The pressure rod $p^{27}$, the rod $p^{14}$ and the lever $p^{17}$ have now ascended in consequence of the tension of the spring $r^2$ (Fig. 31) whereby the first small thread guide tube has again been put into the tangential position like the others. The upward and downward movement of the pressure rod $p^{27}$ is effected by a cam $p^{28}$ on the shaft O (Figs. 29 and 40), the treadle lever $p^{29}$ mounted upon the shaft $p^{30}$ and the arms of the pressure rod $p^{27}$. The pattern P is advanced at the suitable moment by an eccentric $p^{31}$ upon the driving shaft $f$ (Figs. 30 and 39) and a spring $p^{90}$ holding a treadle lever $p^{32}$ in contact with eccentric by means of which the treadle lever $p^{32}$, rod $p^{33}$ and lever $p^{34}$ actuate the pawl $p^{35}$ which intermittently turns the ratchet wheel $p^{36}$ on shaft $p^{34}$ and which revolution is participated in by the worm $p^{37}$ upon the same shaft and communicated to the worm wheel $p^{38}$ and the shaft of the pattern drum $p^{39}$.

For one revolution of the driving axis $f$ the pattern P may be advanced for every pile thread and at every time the required little tube would be adjusted no matter whether the color changes or not. In case however the color is intended to be retained a repeating apparatus may be combined with the Jacquard apparatus just described to interrupt the work of the pattern cylinder $p^{39}$. In the same manner the other movable parts provided for the Jacquard apparatus must also come to a standstill, that is, the needle plate $p^3$, the pressure rod $p^{27}$ above the wire rods $p^{14}$ and the pressure rod $p^{26}$, which causes the wire rod $p^{14}$ to swing out so as to bring the wire $p^{13}$ into contact with the needles N. This repeating apparatus is controlled by a supplemental Jacquard mechanism, which operates in connection with additional holes of the same pattern P (Fig. 33) and for this purpose besides the points for the thread delivery tubes another ten points have been provided for the repeating devices. While however always only one of the thread tube points in each row is perforated the number of the holes on one row of the other ten points varies and depends upon the number of repetitions of one and the same color. For the additional ten points further ten wires are provided which are controlled in exactly the same manner by ten additional needles as the wires of the Jacquard apparatus.

Figure 32:
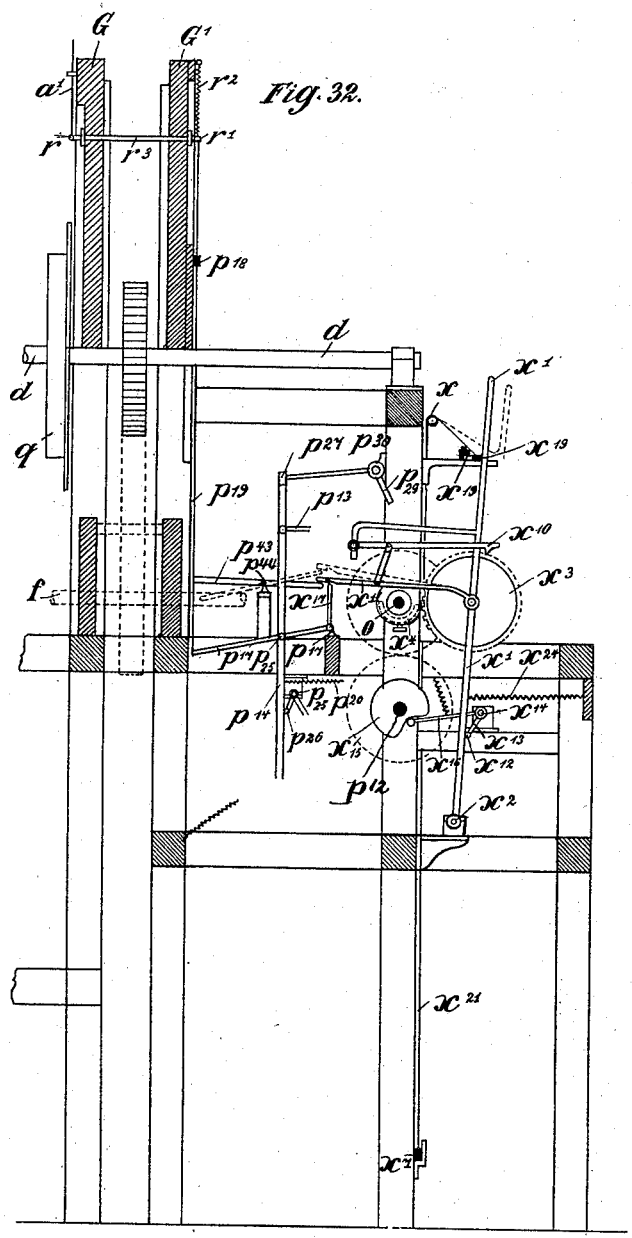

The pressure rods $p^{27}$ press upon their wire rods $p^{14}$ and thus depress the levers $p^{17}$. The latter however by means of cords $p^{42}$ conducted over rollers are tied to levers $p^{43}$ (Figs. 31 and 32) which can turn at $p^{44}$. When a hole is present in the pattern P and a lever $p^{17}$ moves down, the lever $p^{43}$ is depressed at the left and raised at the right (Fig. 32). The ten levers $p^{43}$ (of which four only are shown in the figures) communicate with the levers $x'$ which rotate on the axis $x^2$.

The levers $x'$ each carry a wheel $x^3$. The wheels $x^3$ are of a duplex character as shown more particularly in Figs. 34, 35, 36, and 37 and each wheel is of double width and has upon the left hand side of its periphery gear teeth extending entirely around the same, while the right hand portion of the periphery of each wheel differs from the left hand portion except in one instance. But four of these wheels are shown in the drawings and the wheel 1 to the left of the series has both parts of its periphery provided with the same number of teeth. Wheel 2 has on the right hand portion of its periphery a mutilated gear corresponding with the gear on the other portion of its periphery with every other tooth removed. Wheel 3 has a similar mutilated gear on the right hand portion of its periphery but in this case only every fourth tooth is retained. Wheel 4 has a similar mutilated gear on its right hand portion only every eighth tooth being retained. The right hand portions of the other wheels of the series of ten are similarly provided with mutilated gears in which only the sixteenth, thirty-second, sixty-fourth, one hundred and twenty-eighth, two hundred and fifty-sixth and five hundred and twelfth teeth are retained respectively.

Upon the cross shaft O driven by bevel wheels from the driving shaft $f$, is splined a sleeve $x^4$ provided with a mutilated pinion having but a single tooth. This mutilated pinion may be moved past the ten levers $x'$ and when retained in position opposite the left hand portion of either of the wheels $x^3$, will engage the teeth of said wheel and move the wheel one tooth at each revolution of the shaft O provided such wheel has been moved to its inner position. The sliding mutilated pinion is moved in one direction on the shaft O by means of a rod $x^5$ having a fork engaging a groove in the sleeve carrying the pinion. The rod $x^5$ is connected with a lever $x^6$ which has its lower end pivoted to a rod or bar $x^7$ mounted to slide in bearings near the lower part of the frame. This bar at the other end is provided with a hook which engages a pin $x^{22}$ projecting from a lever $x^8$ which is held in contact with a cam $x^9$ by a suitable spring $x^{90}$. The lever $x^6$ and the rod $x^5$ are moved in the opposite direction by the spring $x^{28}$.

Each of the levers $x'$ is provided with an inwardly extending rigid arm to which is pivoted a lever $x^{10}$ provided with a projection resting upon the right hand portion of the wheel carried by its respective lever $x'$. To each lever $x'$ is also pivoted a hook rod $x^{11}$ which is connected by a short link, with the lever $x^{10}$.

The levers $x'$ are all thrown inward by means of a rod $x^{12}$ carried by arms $x^{13}$ depending from a rock shaft $x^{14}$. This rock shaft is provided with another arm $x^{16}$ which is held in contact with a cam $x^{15}$ by a suitable spring. When the higher grade of the cam bears upon the end of the arm $x^{16}$ that arm is pressed downward, moving the rod $x^{12}$ away from the levers $x'$ and permitting them to be drawn outwardly by the springs $x^{24}$ connected thereto. When, however, the lower grade of the cam comes opposite the end of the arm 16, the spring connected with said arm moves the same upward causing the rod $x^{12}$ to engage the levers $x'$ and move them inwardly. The inner ends of the hook rods $x^{11}$ are each over the outer end of one of the levers $p^{43}$ and when the outer end of these levers $p^{43}$ are raised the hook rods will also be raised, but when the needles controlling the levers $p^{43}$ are allowed to descend by reason of perforations in the pattern card, the outer ends of levers $p^{43}$ will be depressed and the inner ends of the corresponding hook rods $x^{11}$ will be thereby lowered.

When the levers $x'$ move forward toward the axis $o$ the hook rods or wires $x^{11}$ not raised by the levers $p^{43}$ will hook upon or engage a fixed iron plate $x^{17}$. The raised rods however will remain free and when the pressure rod $x^{12}$ together with the levers $x'$ go back the levers $x'$ that correspond to the arrested wires $x^{11}$ will be retained in their inner position. The levers $x'$ during their forward motion also press forward a lever $x^{19}$ swinging horizontally around a pivot $x^{18}$ whereby a cord $x^{21}$ conducted over pulley $x^{20}$ and tied to the rod $x^7$ and counterbalanced by means of lever and weight is slackened and the rod $x^7$ in consequence of its downward movement is disengaged from the pin $x^{22}$ of the lever $x^8$. The movement of the lever $x^8$ continues but is no longer transferred to parts $x^7$, $x^6$, $x^5$ and $x^4$. Prior to the inward movement of the levers $x'$, the mutilated pinion $x^4$ has been moved to the right, expanding the spring $x^{23}$. Now when the rod $x^7$ has been released the spring contracts and the mutilated pinion $x^4$ quickly goes to the left passing those wires $x^{11}$ that are raised, but is eventually arrested by the first downward inclined wire $x^{11}$. As the corresponding lever $x'$ has now finished its forward movement the revolving mutilated pinion $x^4$ with its tooth engages into the completely formed tooth wheel $x^3$ of this lever and turns this to the distance of one tooth. This will continue, that is, the wheel $x^3$ at every revolution of the main shaft $f$ will be turned one tooth until the space between two of the isolated teeth of the mutilated half of such wheel has been passed when the lever $x^{10}$ is lifted by the next tooth of said mutilated gear. The wire $x^{11}$ now likewise rises and disengages itself from the plate $x^{17}$. Its lever $x'$ by means of the spring $x^{24}$ is pulled back and the mutilated pinion $x^4$ in consequence of the spring tension $x^{23}$ is carried farther to the left, until its movement is limited by another hook rod $x^{11}$ where the same process is repeated. If at last all inclined hook rods $x^{11}$ have been passed and $x^4$ has arrived at its extreme position on the left and all the levers $x'$ have returned, the horizontally swinging lever $x^{19}$ in consequence of the tension of its spring $x^{25}$ (Fig. 38 detail) has gone back and pulled the cord $x^{21}$ and lifted the rod $x^7$ to such an extent that it is again coupled with the treadle lever $x^8$. If a hole were present in the pattern P for the needle, controlling wheel 1 the mutilated pinion $x^4$ would simply have gone to the left without first finding an obstruction. The tooth of wheel $x^4$ turns the wheel 1 directly for the distance of one tooth, hook rod $x^{11}$ rises at once and rod $x^7$ is at once coupled again with lever $x^8$. With a hole for needles controlling wheels 2 and 1 the mutilated pinion $x^4$ is arrested by the hook rod $x^{11}$ belonging to the wheel 2. After two revolutions (Fig. 35) the hook rod $x^{11}$ is disengaged and mutilated pinion $x^4$ moves farther to the left restoring the initial position at 1 after one revolution. Therefore three revolutions have been made before rod $x^7$ again is hooked into lever $x^8$.

If holes were present in the card for the needles controlling all ten of the wheels the mutilated pinion $x^4$ after five hundred and twelve revolutions would advance to wheel 9. Then after two hundred and fifty-six revolutions, it would advance to wheel 8. Then after one hundred and twenty-eight revolutions it would advance to wheel 7. Then after sixty-four revolutions it would advance to wheel 6. Then after thirty-two revolutions it would advance to wheel 5. Then after sixteen revolutions it would advance to wheel 4. Then after eight revolutions it would advance to wheel 3. Then after four revolutions it would advance to wheel 2. Then after two revolutions it would advance to wheel 1 and then after one revolution the period would be terminated, that is, altogether ten hundred and twenty-three revolutions of the shaft O, would be necessary for one period during which time one single color would be inserted in the chenille.

It is obvious that by the correct choice of the holes in the pattern P the greatest variety of figures for the repetition of the same color of the pile threads can be obtained and arranged in tables so that it is easy to determine how in every particular case the pattern P must be arranged. The repeating apparatus just described serves the object of setting the working parts of the main Jacquard apparatus to rest, until the color change is required to take place. This is effected by the horizontally swinging lever $x^{19}$ which is prevented from moving backward to the extent determined by the repeating apparatus and its pattern. This lever $x^{19}$ controls the said parts by acting through intermediate devices to hold the treadle levers in such position that their rollers engage only the highest grades of their respective cams thereby preventing them from actuating the devices connected therewith.

Fig. 39 shows the disengaging mechanism for the pattern card drum $p^{39}$.

The horizontally swinging lever $x^{19}$ during its forward movement moves the double lever $d^2$ $d^3$ pivoted at $d'$. The lower portion $d^3$ moves in the opposite direction and turns the finger $d^4$ in such a way that the end of the finger is brought opposite to and in engagement with the ratchet lever $p^{34}$ (Fig. 39$^a$) and holds the treadle lever $p^{32}$ in its extreme left position where it is unaffected by the cam $p^{31}$ until the lever $x^{19}$ retires through the action of the repeating apparatus. The pattern therefore in consequence will likewise rest to the same extent.

Fig. 40 represents the disengaging mechanism for the pressure rod $p^{27}$ of the wire $p^{14}$ as well as that for the pressure rod $p^{26}$ for again adjusting or engaging the wires $p^{13}$ so as to start or repeat the process of the wire action. When the pressure rod $p^{27}$ has gone down and the thread tube $r$ and repeating lever $x'$ have been adjusted by the pattern, rod $p^{27}$ is retained in its position by lever $d^6$ joined to the horizontally swinging and advancing lever $x^{19}$ by means of rod $d^5$. The lever $d^6$ by means of a notch catches the pin $d^7$ of the treadle lever $p^{29}$ and thus retains it in its extreme right-hand position until lever $x^{19}$ (after the repeating wheels 1 to 10 have been passed) again goes back with lever $d^6$. The pressure rod $p^{26}$ remains in its position owing to the treadle lever $p^{22}$ likewise remaining arrested in its extreme right hand position. This is effected by the lever $d^8$ which at the bottom has the fixed pawl $d^9$. If the lever $d^8$ by means of the horizontally swinging lever $x^{19}$ is pushed forward, the pawl $d^9$ hooks over a pin $d^{10}$ of the treadle lever $p^{22}$ and holds it arrested until the lever $x^{19}$ returns after the repeating apparatus has done its work.

Fig. 41 shows the disengaging mechanism for the needle plate $p^2$. The latter is intended to remain in its lowest position as long as no backward movement of the pattern takes place. This is effected by the double lever $d^2$ $d^3$ as previously shown in Fig. 39 resting with its foot $d^3$ upon the arm $p^4$ of the needle plate $p^2$ thus holding the same in the lowest position whereby the treadle roller $p^6$ is also rendered ineffective.

It is obvious that three methods can be executed by the described machine. In the first case the sewing apparatus may be allowed to act upon each of the strong binding threads arranged above each other. In the second case the upper binding threads at the place where the stitching is to take place may be left out and arranged as guide threads. In the last case the pile threads are stitched together by themselves between the binding threads which serve as guide threads.

Having now particularly described and ascertained the nature of my said invention and in what manner the same is to be performed, I declare that what I claim is—

1. A chenille machine comprising among its members mechanism for supplying color threads, of a predetermined length one after another in a uniform succession, mechanism for supplying binding threads or cords for the color threads and stitching mechanism for uniting the binding and color threads, substantially as described.

2. A chenille machine comprising among its members mechanism for supplying color threads, of a predetermined length one after another in a uniform succession, pattern mechanism for selecting the color threads, mechanism for supplying binding threads or cords for the color threads and stitching mechanism for uniting the binding and color threads, substantially as described.

3. A chenille machine comprising among its members mechanism for supplying color threads, of a predetermined length one after another in a uniform succession, mechanism for supplying binding threads or cords for the color threads, mechanism for bringing each color thread to a certain position relative to the binding threads and stitching mechanism for uniting the binding threads and color threads, substantially as described.

4. In a chenille machine the combination with means for holding various colored threads, of a pattern controlled mechanism for selecting a particular thread, mechanism for removing a predetermined length of said thread and means for changing the length of thread to be removed substantially as described.

5. In a chenille machine the combination with a series of thread holding devices, of a pattern controlled mechanism for selecting a particular thread, of mechanism for removing a predetermined length of the selected thread and means for moving said mechanism along the series of thread holding devices, substantially as described.

6. In a chenille machine the combination with the revoluble grippers and severing device, of a series of thread delivery tubes arranged concentrically to the axis of the grippers, pattern controlled mechanism for selecting a particular thread and means for actuating the grippers and severing device when rotated, substantially as described.

7. In a chenille machine the combination with the thread receiving grate, of the thread supplying devices for placing thread upon the grate and the presser for insuring the release of the thread from the supplying devices and retaining it upon the grate, substantially as described.

8. In a chenille machine the series of thread delivery tubes normally held in a certain position and adapted to be turned into a different position, of the movable gripping devices adapted to be moved along the series of thread tubes, said gripping devices comprising among their members a device for controlling the operation of the grippers said device provided with a finger to engage the thread delivery tubes out of normal position, substantially as described.

9. In a chenille machine the combination with a series of thread delivery devices, of a pair of thread grippers and means for moving them along the series of thread delivery devices, substantially as described.

10. In a chenille machine the combination with a pair of revoluble thread grippers, of a series of thread delivery devices arranged concentrically to the axis of the grippers and means for adjusting said grippers toward and from one another, substantially as described.

11. In a chenille machine the combination with a rotating disk, of two rails pivoted upon the axis of the disk and extending beyond the periphery of said disk and provided with gripping devices, of devices for clamping said rails to said disk at different distances apart, and thread supplying devices substantially as described.

12. The combination with the revoluble pivoted gripping jaws, of the sliding rods for opening and closing the same, a spring for moving said rods in a direction to close said jaws, the said jaw opening devices including the fixed thumb piece and stop, and a stop rotating with said jaws for engaging said rods to hold the jaws open, substantially as described.

13. In a chenille machine the combination with a series of thread delivery devices, of a pair of thread grippers, one of said grippers being provided with a thread severing device, substantially as described.

14. The combination with the pivoted gripping jaws and shear jaws, one of said gripping jaws having a short movement independently of its companion shear blade, the said gripping jaw and shear blade being provided with inclined slots, actuating devices engaging said slots, a spring pressing on said gripping jaw and provisions for lost motion between the said gripping jaw and shear blade substantially as described.

15. The herein described thread adjusting mechanism consisting of the movable grate and the adjuster for engaging the bars of the grate cooperating therewith.

16. The combination with the movable grate, means for supplying separate lengths of thread to said grate and the reciprocating adjuster, capable of entering between the bars of the grate for moving said grate substantially as described.

17. The combination with the movable grate, of mechanism for supplying predetermined lengths of thread to said grate, the presser for pressing the thread down upon the grate and the adjuster, for engaging and moving said grate substantially as described.

18. The combination of the mechanism for supplying binding threads, of the grate, means for supplying color threads to the grate and the feeder for moving the color threads on the grate into engagement with the binding threads, substantially as described.

19. The combination with means for supplying binding and color threads, the stitching mechanism, the take up devices and the cutting mechanism, substantially as described.

20. In a chenille machine the combination with the series of journaled thread delivery tubes and having a projecting angular delivery portion, of pattern controlled devices for turning said tubes, substantially as described.

21. In a chenille machine the combination with a series of journaled thread delivery tubes, each having an angular projection, of pattern controlled devices for turning the tubes and devices for removing a portion of thread from the tube turned by the said mechanism, substantially as described.

22. In a Jacquard apparatus the combination with the spring controlled levers and hooked wires connected to said levers, of the pattern, the needles engaging said pattern, the hooked wires engaging said needles and the depressor for depressing the said levers, substantially as described.

23. The combination with a series of thread supplying devices, of selecting devices for selecting a particular thread of the series, thread removing devices for removing a portion of the thread selected and repeating devices for stopping the selecting devices and causing the removal of successive portions of the thread last selected, substantially as described.

24. The combination with a series of thread supplying devices, of thread selecting devices and repeating mechanism comprising among its members the double wheels, the sliding mutilated pinion and means for retaining the pinion in gear with said wheels, substantially as described.

25. The combination with the double wheel, the lever carrying the same, the mutilated pinion for moving the double wheel, a spring for forcing the mutilated pinion in a certain direction past the double wheel, the lever resting on one part of the double wheel, the hook rods connected to said levers for holding the mutilated pinion in line with the other portion of the double wheel, and retaining means to be engaged thereby substantially as described.

26. The combination with the levers carrying the double wheels, means to move the levers to carry the wheels into operative position, hooked rods connected with said levers, a retaining plate for said rods and pattern mechanism for selecting the rods which shall engage the said plate, substantially as described.

27. The combination with the double wheels, of the sliding mutilated pinion, a cam and devices connecting it with the said pinion to move it in one direction, a spring for moving it in the opposite direction, and means for disconnecting the devices which connect the cam and pinion, whereby at certain points the pinion is left to be moved by its spring solely, substantially as described.

In witness whereof I have hereunto set my hand in presence of two witnesses.

FRITZ WATZLAWIK.

Witnesses:
PAUL FISCHER,
ROBERT BRÄUTIGAM.